(12) United States Patent
Inada et al.

(10) Patent No.: US 10,334,237 B2
(45) Date of Patent: Jun. 25, 2019

(54) INFORMATION PROCESSING DEVICE, DISPLAY DEVICE, AND INFORMATION PROCESSING METHOD

(71) Applicant: Sony Computer Entertainment Inc., Tokyo (JP)

(72) Inventors: Tetsugo Inada, Kanagawa (JP); Shoichi Ikenoue, Chiba (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 239 days.

(21) Appl. No.: 14/992,522

(22) Filed: Jan. 11, 2016

(65) Prior Publication Data

US 2016/0227203 A1    Aug. 4, 2016

(30) Foreign Application Priority Data

Jan. 29, 2015   (JP) .................................. 2015-015274

(51) Int. Cl.
| | | |
|---|---|---|
| *G06T 19/00* | (2011.01) | |
| *H04N 13/279* | (2018.01) | |
| *H04N 13/332* | (2018.01) | |
| *H04N 13/366* | (2018.01) | |

(52) U.S. Cl.
CPC ......... *H04N 13/366* (2018.05); *G06T 19/006* (2013.01); *H04N 13/279* (2018.05); *H04N 13/332* (2018.05)

(58) Field of Classification Search
CPC ............ G02B 27/017; G02B 2027/014; G02B 2027/0187; G02B 2027/0138; G02B 27/0172; G02B 27/0093; G06T 19/006; G06F 3/011; G06F 3/013; G06F 3/012; G06F 3/04815; G06F 3/0346; H04N 13/044; H04N 13/0239
See application file for complete search history.

(56) References Cited

U.S. PATENT DOCUMENTS

2006/0239525 A1 * 10/2006 Katayama ............. G06T 19/006
382/128

FOREIGN PATENT DOCUMENTS

| EP | 0 999 518 | 5/2000 |
| JP | 2010-534895 A | 11/2010 |
| JP | 2014-238731 A | 12/2014 |
| WO | WO 2009/018161 A1 | 2/2009 |

OTHER PUBLICATIONS

Japanese Office Action dated Jul. 17, 2018 for the Corresponding Japanese Patent Application No. 2015-015274.

* cited by examiner

*Primary Examiner* — Farhan Mahmud
(74) *Attorney, Agent, or Firm* — Katten Muchin Rosenman LLP

(57) ABSTRACT

An information processing device includes: an information processing section configured to detect a figure of a target object from an image captured from a movie of the target object so as to perform information processing on the detected image; a main data generating section configured to generate data of a main image to be displayed as a result of the information processing; an auxiliary data generating section configured to generate data of an auxiliary image including the captured image; and an output data transmitting section configured to transmit to an output device the main image data and the auxiliary image data in relation to each other such that the main image and the auxiliary image are displayed together.

8 Claims, 16 Drawing Sheets

F I G. 1
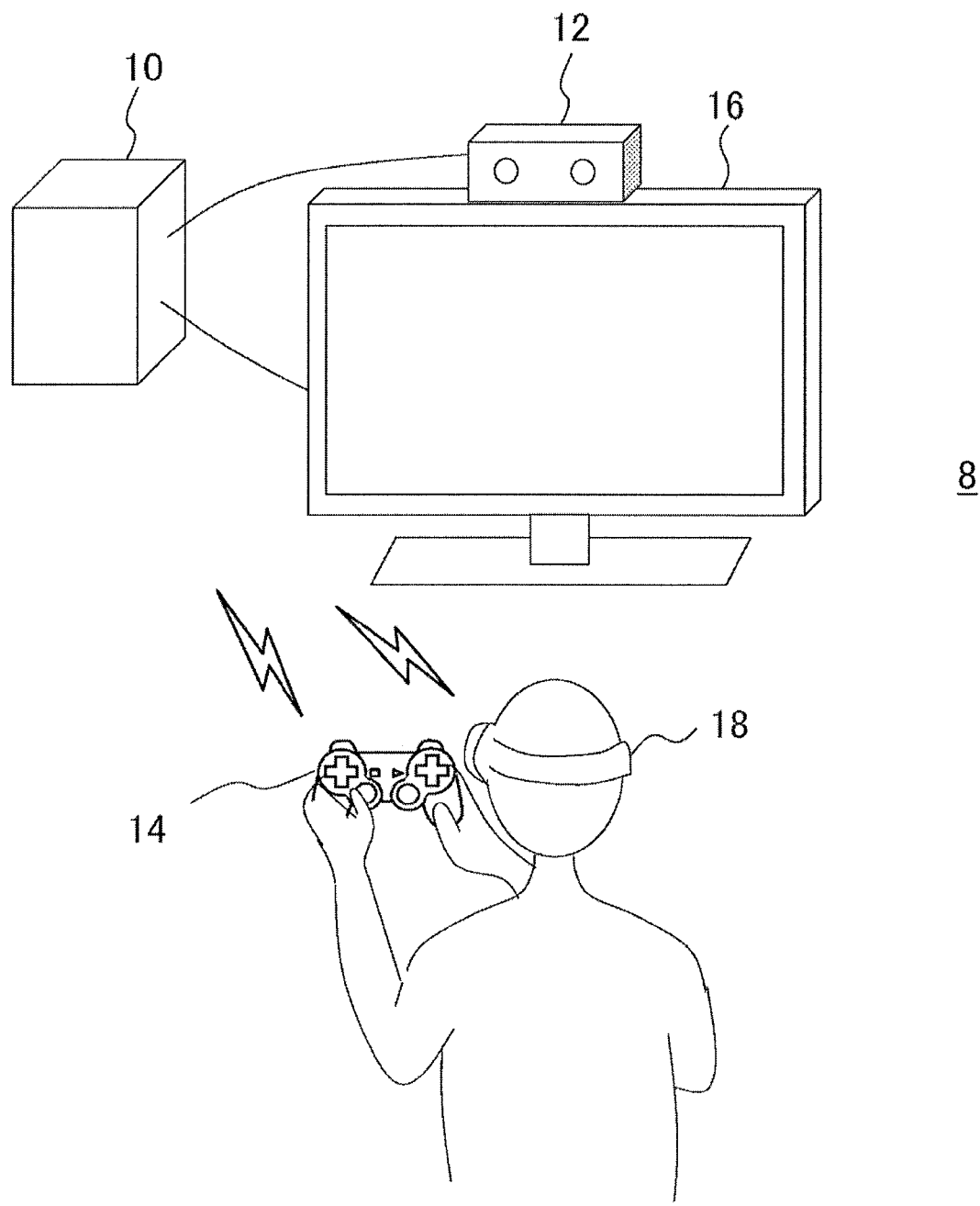

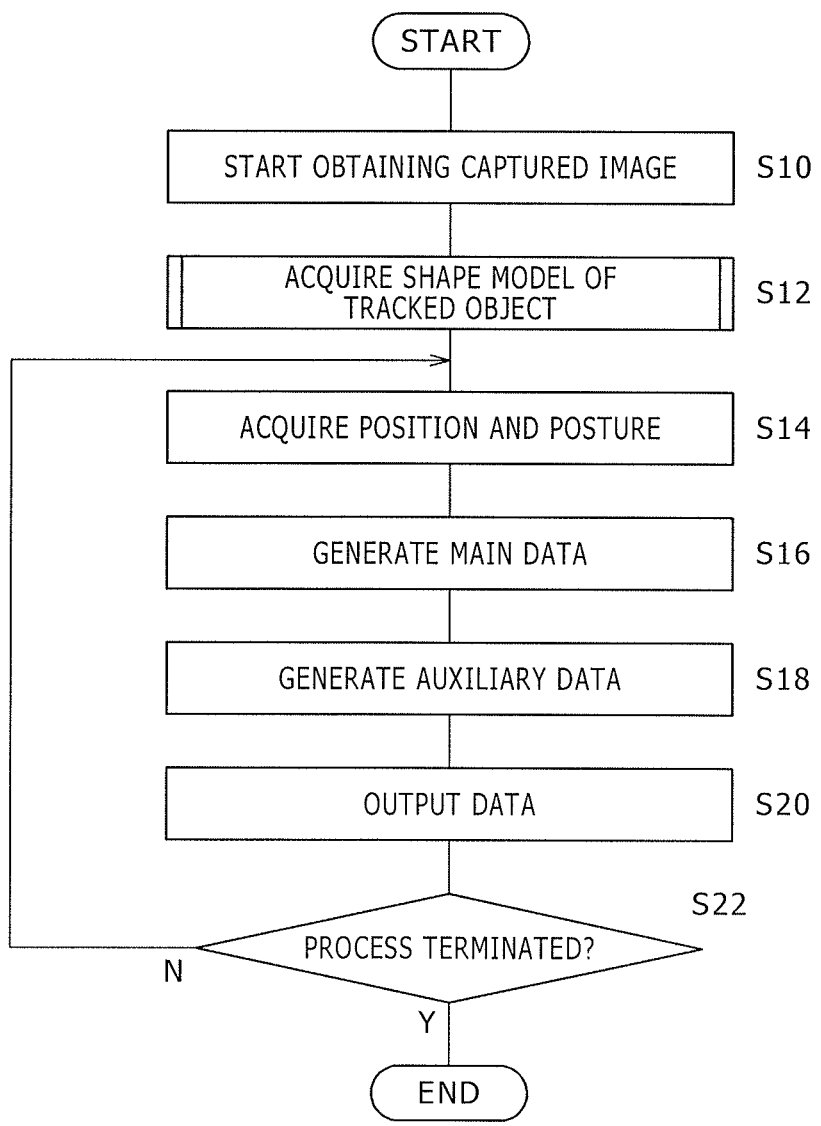

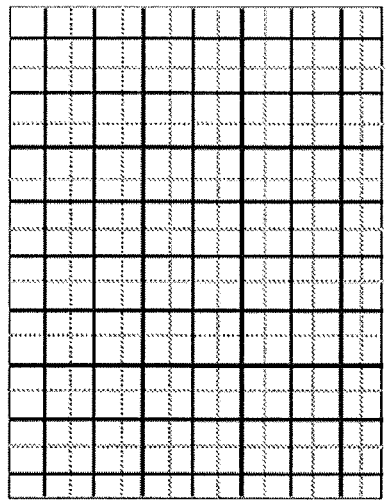
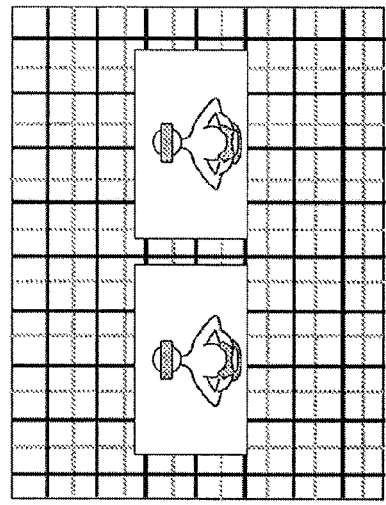
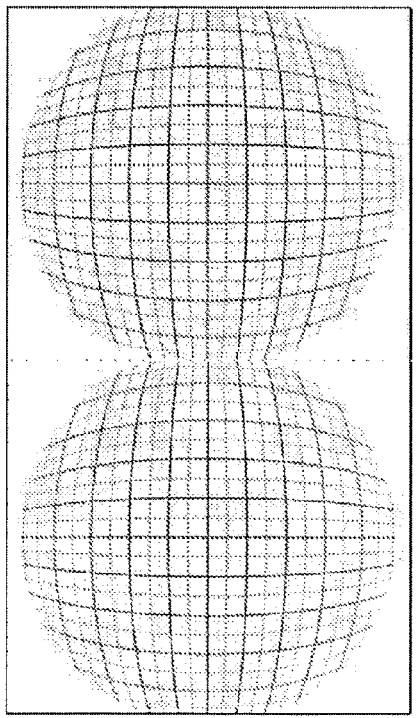
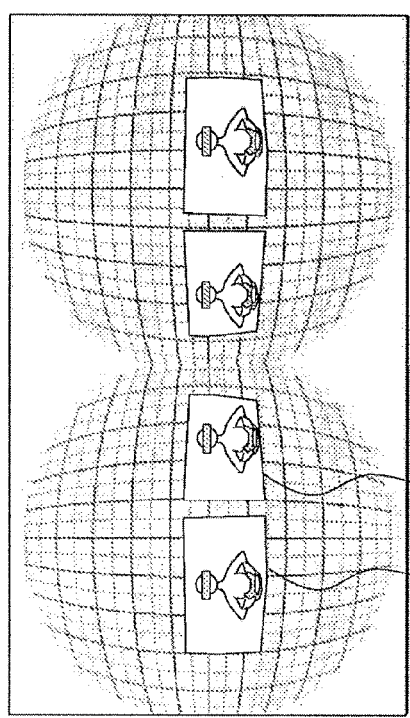
FIG. 9A
FIG. 9B
150a 150b

FIG.10
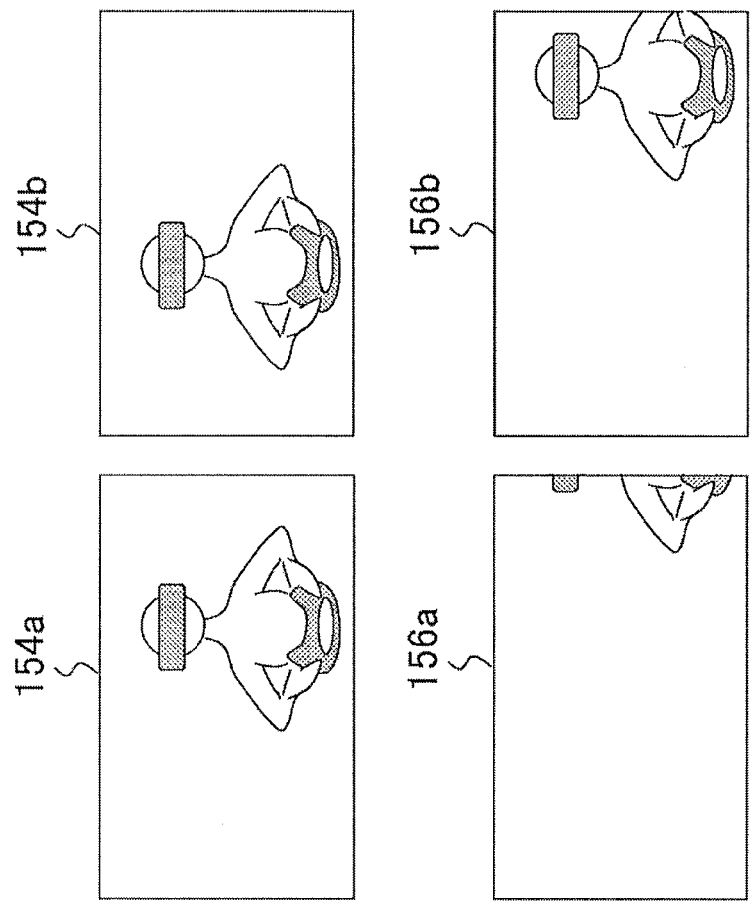
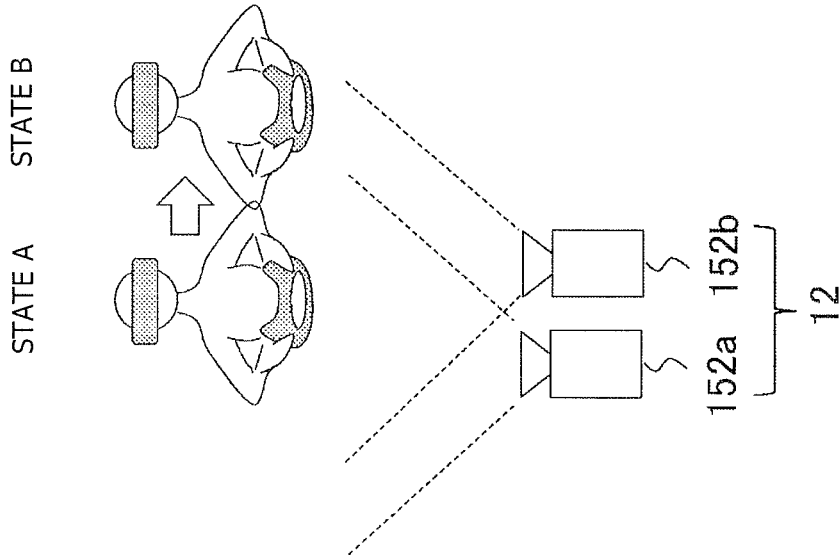

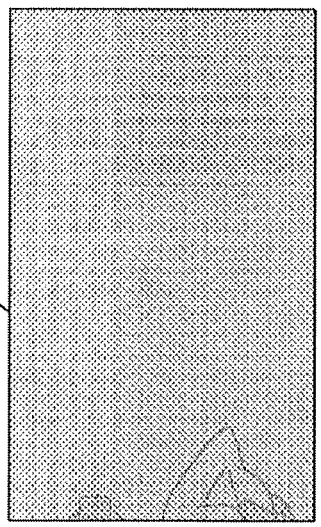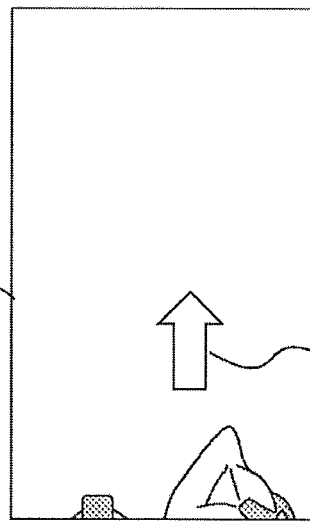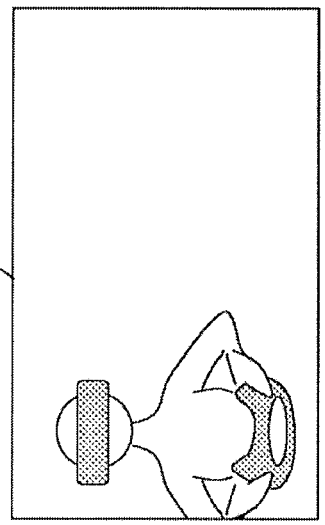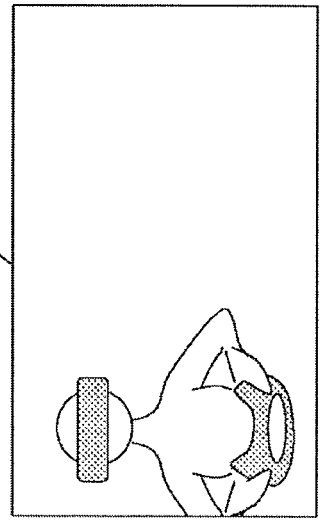
FIG. 11A  FIG. 11B

F I G. 1 3
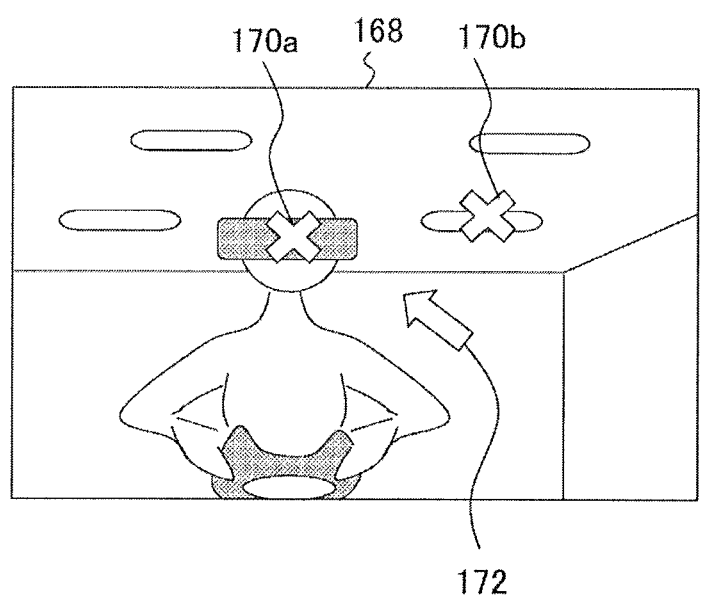

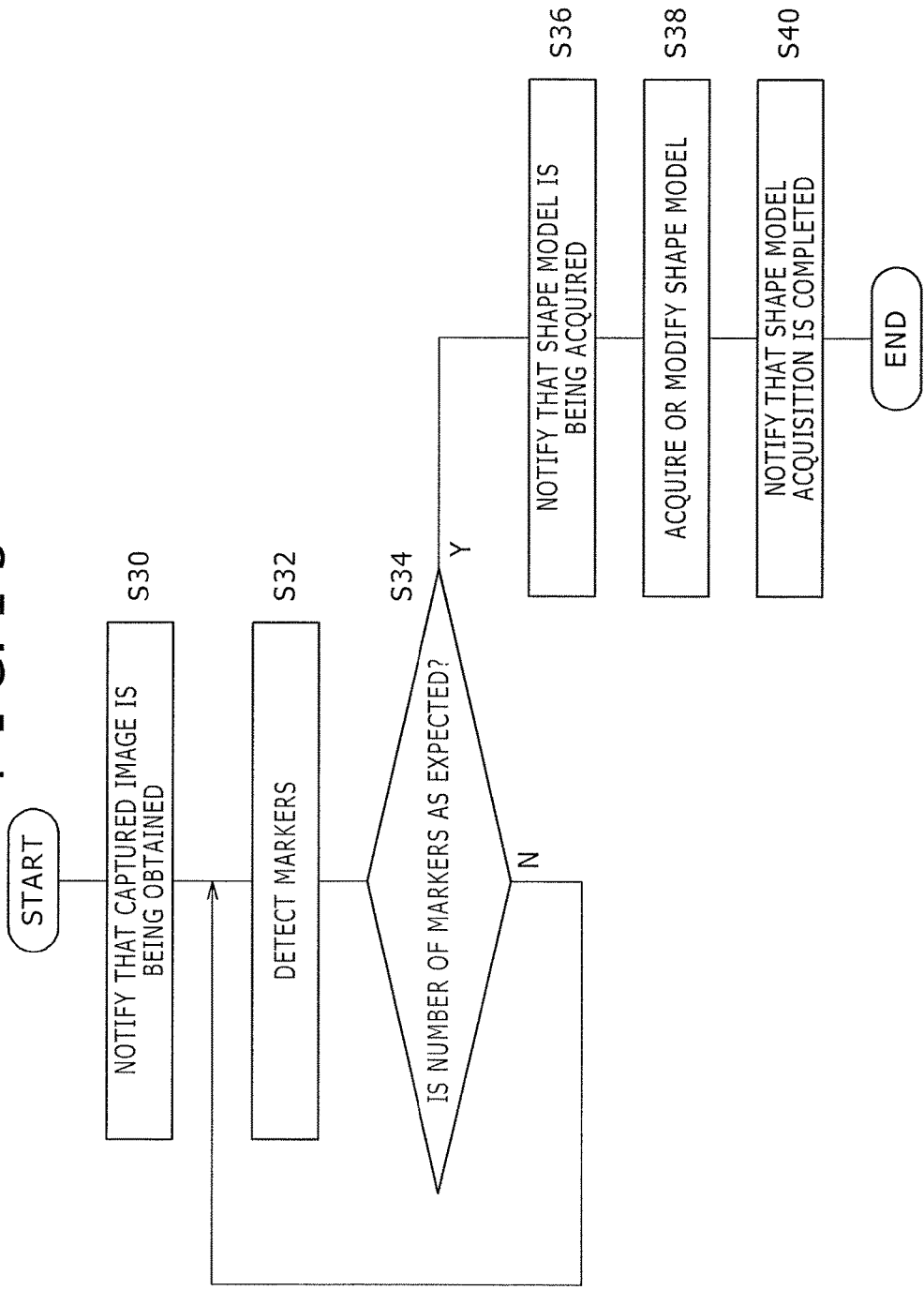

INFORMATION PROCESSING DEVICE, DISPLAY DEVICE, AND INFORMATION PROCESSING METHOD

BACKGROUND

The present disclosure relates to information processing technology for detecting a target object from captured images.

Some video games involve capturing an image of a user's body and markers with a camera and having relevant regions of the captured image replaced with another image for display on a display device (see European Published Patent No. EP 0999518 A1). Also known are user interface systems by which the movements of the user's mouth and hands are interpreted as instructions to operate an application. Such technology for capturing the real world in order to display a virtual world reacting to imaged movements in the real world or to perform some kind of information processing on the images has been used extensively on diverse scales ranging from small mobile terminals to leisure facilities.

SUMMARY

The above-outlined technology faces the important challenge of how to accurately acquire information about the real world from captured images. Depending on the circumstances of image capture and on the conditions of the target object, problems can arise such as many errors included in acquired information and insufficient amount of that information. This can adversely affect subsequent information processing and its output or disable the information processing altogether. Image correction and other measures are usually taken to minimize the adverse effects of shifting conditions in the real world. However, there can be varying circumstances of image capture and changing conditions of the user, which are difficult to overcome with those corrective measures alone. Some negative factors are easy for the user to improve but are sometimes left unattended to because the user is not aware of them. The more sophisticated the technology of information processing becomes, the more conspicuous this problem can become.

The present disclosure has been made in view of the above circumstances and provides techniques for suitably performing information processing by use of captured images while being minimally affected by the varying circumstances of image capture and the changing conditions of the target object.

According to an embodiment of the present disclosure, there is provided an information processing device including: an information processing section configured to detect a figure of a target object from an image captured from a movie of the target object so as to perform information processing on the detected image; a main data generating section configured to generate data of a main image to be displayed as a result of the information processing; an auxiliary data generating section configured to generate data of an auxiliary image including the captured image; and an output data transmitting section configured to transmit to an output device the main image data and the auxiliary image data in relation to each other such that the main image and the auxiliary image are displayed together.

According to another embodiment of the present disclosure, there is provided a display device including: an output data receiving section configured to acquire, from an information processing device connected thereto, data relating a main image to an auxiliary image, the main image being an image to be displayed as a result of information processing performed on a figure of a target object detected from an image captured from a movie of the target object by the information processing device, the auxiliary image including the captured image; and a display processing section configured to display the main image and the auxiliary image together.

According to a further embodiment of the present disclosure, there is provided an information processing method including: performing information processing on a figure of a target object detected from an image captured from a movie of the target object after obtaining the image from the imaging device; generating data of a main image to be displayed as a result of the information processing; generating data of an auxiliary image including the captured image; and transmitting to an output device the main image data and the auxiliary image data in relation to each other such that the main image and the auxiliary image are displayed together.

If other combinations of the above-outlined composing elements or the above expressions of the present disclosure are converted between different forms such as a method, a device, a system, and a computer program, and a recording medium recording such a computer program, they still constitute effective embodiments of this disclosure.

The present disclosure enables information processing to be performed appropriately on captured images regardless of surrounding circumstances.

BRIEF DESCRIPTION OF THE DRAWINGS

Other modes of the disclosure will become apparent from the following description of embodiment with reference to the accompanying drawings in which:

FIG. 1 is a schematic diagram showing an exemplary configuration of an information processing system in one embodiment of the present disclosure;

FIG. 8 is a flowchart showing steps of carrying out information processing on a captured image and of displaying the processed image in this embodiment;

FIGS. 9A and 9B are schematic diagrams showing exemplary images displayed with this embodiment;

FIG. 10 is an explanatory diagram explaining how the views and stereoscopic images of a stereo camera are related in this embodiment;

FIGS. 11A and 11B are schematic diagrams showing an example in which captured images are processed to provide auxiliary data in this embodiment;

FIG. 13 is an explanatory diagram explaining how the situation explained in FIG. 12 is improved;

FIG. 15 is a flowchart showing a procedure for acquiring a shape model of a tracked object, the procedure being performed in step S12 of FIG. 8 by a tracked object modeling section of the information processing device.

DETAILED DESCRIPTION OF THE PREFERRED EMBODIMENT

Figure 2:
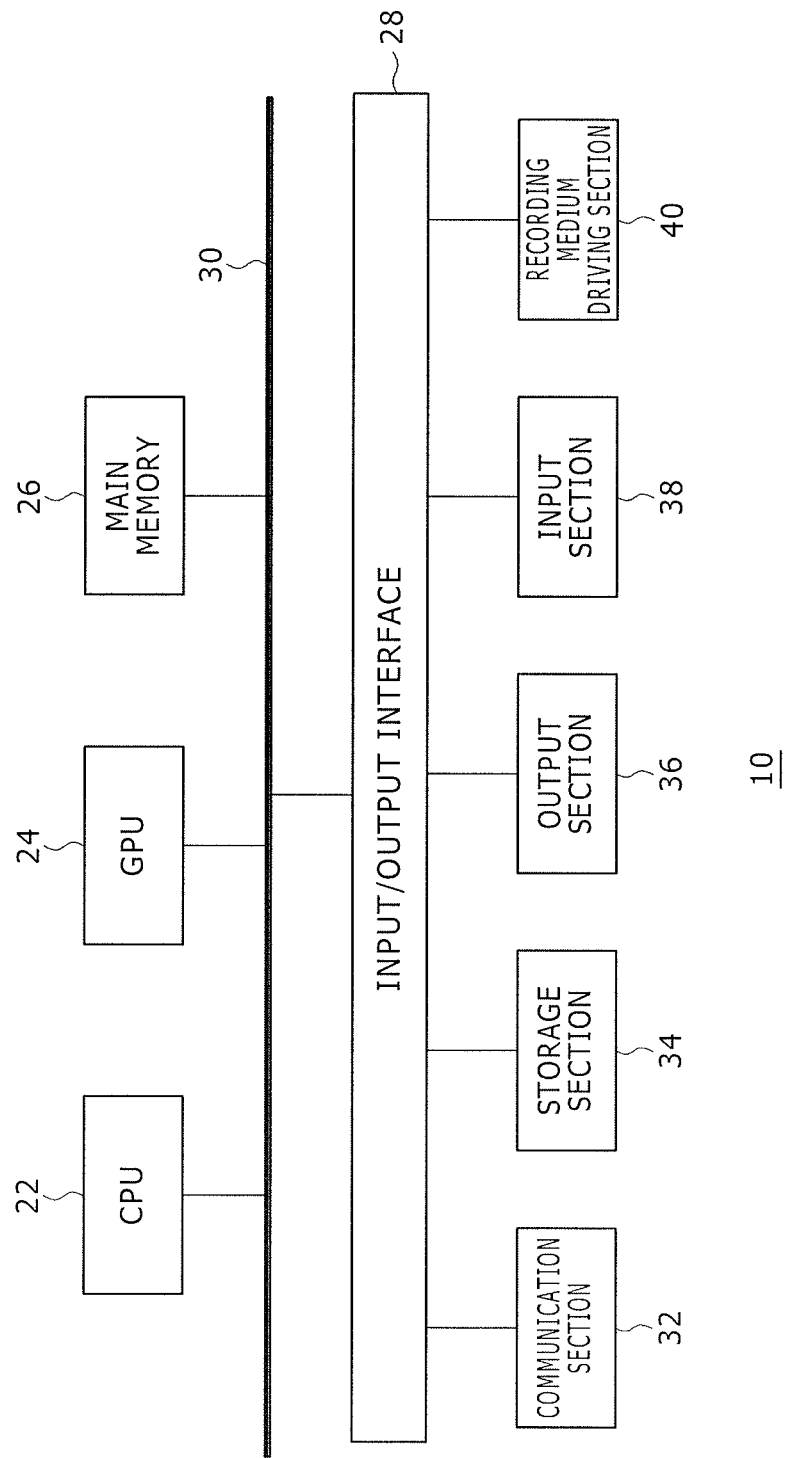
FIG. 2 is a schematic diagram showing an internal circuit structure of an information processing device in this embodiment.

FIG. 1 is a schematic diagram showing an exemplary configuration of an information processing system 8 in one embodiment of the present disclosure. The information processing system 8 includes an imaging device 12 that captures a figure of a target object, an information processing device 10 that performs information processing on the captured image, a flat display 16 and a head-mounted display (called the HMD hereunder) 18 displaying images obtained as a result of the information processing, and an input device 14 operated by a user.

The information processing device 10, imaging device 12, input device 14, flat display 16, and HMD may be interconnected by cables or wirelessly involving known wireless communication technology such as Bluetooth (registered trademark). Depending on the information processing performed by the information processing device 10, either the flat display 16 or the HMD 18 may be omitted. The appearances of these devices are not limited to what is illustrated in the drawing. Two or more of these devices may be provided integrally in a single device. For example, the information processing device 10, input device 14, and flat display 16 may be implemented integrally in a mobile terminal.

The imaging device 12 has a camera that captures an image of the target object such as the user at a predetermined frame rate, and a mechanism that performs known processes, such as demosaicing, on an output signal from the camera to generate output data of the captured image before transmitting the generated output data to the information processing device 10. The camera has a visible light sensor, such as a charge-coupled device (CCD) or a complementary metal oxide semiconductor (CMOS) sensor, used commonly in digital cameras and digital video cameras. The imaging device 12 may have only one camera or incorporate what is called a stereo camera in which two cameras are arranged left and right with a known distance in-between as illustrated.

Alternatively, the imaging device 12 may combine a monocular camera with a device that emits reference light such as infrared rays to the target object to measure reflected light from the object. The stereo camera or the reflected light measuring mechanism, if installed, allows the position of the target object to be acquired in a three-dimensional real space. This diversifies the manner in which information is processed by the information processing device 10 and images are displayed by the display device. In this regard, techniques have been known for determining the distance between the target object and the camera by triangulation using stereoscopic images acquired by a stereo camera having the left and right views, and for determining the distance between the target object and the camera by the time-of-flight (TOF) method involving measurement of reflected light from the object or by the pattern projection method.

Although the ensuing paragraphs will focus primarily on how the imaging device 12 captures stereoscopic images, this is not limitative of the present embodiment as mentioned earlier. The imaging device 12 only needs to include at least one camera. The information processing device 10 performs necessary information processing on the data transmitted from the imaging device 12 to generate output data, such as images and sounds. The scope of the processing performed by the information processing device 10 is not limited, and may be determined in accordance with the functions desired by the user or in keeping with the content of the application to be used.

For example, the information processing device 10 performs known processes such as face detection and tracking on the captured image in order to advance a game featuring a character reflecting the movements of the user as the target object or to convert the user's movements into command input for information processing. At this point, a marker mounted on the input device 14 may be used to acquire the movements of the input device 14. Also, multiple markers attached to the external surface of the HMD 18 may be tracked to determine the position and posture of the user's head on which the HMD 18 is mounted, and a virtual world viewed from a view moving with the user's head may be displayed on the HMD 18. The output data generated by the information processing device 10 is transmitted to at least either the HMD 18 or the flat display 16.

The HMD 18 is a display device which, worn by the user on the head, displays images on a display panel, such as an organic electroluminescent (EL) panel, positioned in front of the user's eyes. For example, the HMD 18 generates parallax images viewed from the left and right and displays each image on the left and right screen regions making up the display screen, thus allowing the user to view a three-dimensional (3D) image. Alternatively, a single image may be displayed on the entire display screen. The HMD 18 may further incorporate speakers or earphones that output sounds to where the user's ears are located.

The flat display 16 may be a television (TV) set that has a display for outputting two-dimensional images and speakers for outputting sounds. For example, the flat display 16 may be a liquid crystal display TV set, an organic EL TV set, a plasma display TV set, or a personal computer (PC) display. In another example, the flat display 16 may be the display of a tablet terminal or a mobile terminal with speakers. The input device 14, when operated by the user, receives requests such as those for starting and ending processes, selecting functions, and inputting commands, and outputs the received request to the information processing device 10 as an electrical signal.

The input device 14 may be any one of common input devices such as a game controller, a keyboard, a mouse, a joystick, a touch pad mounted on the display surface of the flat display 16, or a combination of these devices. The input device 16 may further include a light-emitting marker having an element emitting light in a predetermined color, or an aggregate of such light-emitting elements. In this case, the information processing device 10 may track the movement of the marker using captured images and interpret the movement of the input device 14 as the user's operation. As another alternative, the input device 14 may be composed of only a light-emitting marker and a mechanism for holding that marker.

FIG. 2 shows an internal circuit structure of the information processing device 10. The information processing device 10 includes a central processing unit (CPU) 22, a graphics processing unit (GPU) 24, and a main memory 26. These components are interconnected via a bus 30. The bus 30 is also connected to an input/output interface 28. The input/output interface 28 is connected to peripheral device interfaces, such as a USB interface and an IEEE 1394 interface; a communication section 32 made of a wired or wireless local area network (LAN) interface; a storage section 34, such as a hard disk drive or a nonvolatile memory; an output section 36 for outputting data to the flat display 16 and HMD 18; an input section 38 for inputting data from the imaging device 12, input device 14, or HMD 18; and a recording medium driving section 40 that drives removable recording media, such as magnetic disks, optical disks, or semiconductor memories.

The CPU 22 controls the entire information processing device 10 by executing the operating system stored in the storage section 34. The CPU 22 also executes various programs read from the removable recording medium and loaded into the main memory 26 or programs downloaded via the communication section 32. The GPU 24 has the function of a geometry engine and that of a rendering processor. In accordance with a rendering instruction from the CPU 22, the GPU 24 performs a rendering process and stores the resulting display image in a frame buffer (not shown). The GPU 24 proceeds to convert the display image in the frame buffer into a video signal and output the video signal to the output section 36. The main memory 26 is composed of a random access memory (RAM) that stores the programs and data necessary for the processing.

Figure 3:
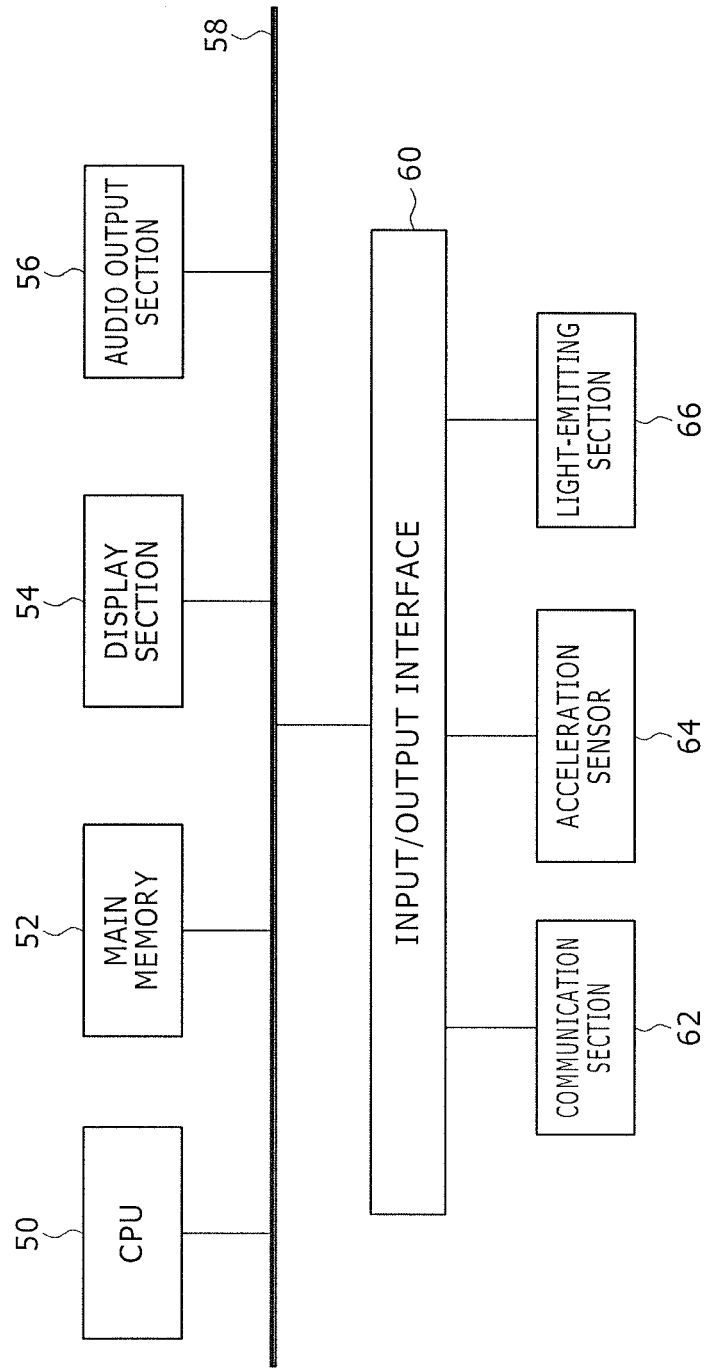
FIG. 3 is a schematic diagram showing an internal circuit structure of a head-mounted display (HMD) in this embodiment.

FIG. 3 shows an internal circuit structure of the HMD 18. The HMD 18 includes a CPU 50, a main memory 52, a display section 54, and an audio output section 56. These components are interconnected via a bus 58. The bus 58 is further connected to an input/output interface 60. The input/output interface 60 is connected to a communication section 62 made of a wired or wireless LAN interface, an acceleration sensor 64, and a light-emitting section 66.

The CPU 50 processes the information acquired from the components of the HMD 18 via the bus 58 and feeds output data to the display section 54 and audio output section 56. The main memory 52 stores the programs and data necessary for processing by the CPU 50. However, depending on the application to be executed or the design of equipment in use, the information processing device 10 may carry out most of the processing, so that the HMD 18 only needs to output the data sent from the information processing device 10. In this case, the CPU 50 and main memory 52 may be replaced with simpler devices.

The display section 52 is formed by a display panel such as a liquid crystal display panel or an organic EL panel. The display section 52 displays images in front of the user's eyes while the HMD 18 is worn by the user. As mentioned above, a pair of parallax images may be displayed on the left and right screen regions corresponding to the user's eyes so that the user may get a stereoscopic view. The display section 54 may further include a pair of lenses positioned between the display panel and the user's eyes when the HMD 18 is worn by the user, the lenses serving to widen the user's viewing angle.

The audio output section 56 includes speakers or earphones positioned where the use's ears are located when the HMD 18 is worn by the user, allowing the user to hear sounds. The number of audio channels for output is not limited. The audio output section 56 may have monaural, stereo, or surround speakers or headphones. The communication section 62 is an interface that transmits and receives data to and from the information processing device 10 and flat display 16. For example, the communication section 62 may be implemented using known wireless communication technology such as Bluetooth (registered trademark).

The acceleration sensor 64 is implemented by use of a known low-g acceleration sensor, for example, which detects the tilt of the HMD 18 by sensing the direction of gravity. The result of the detection is transmitted to the information processing device 10 via the communication section 62. The light-emitting section 66 is an element emitting light in a predetermined color or an aggregate of such light-emitting elements, and is arranged at multiple locations on the external surface of the HMD 18. These light-emitting elements are tracked as markers so as to acquire the position of the HMD 18. Furthermore, the number of marker images and their positional relationships in captured images allow the posture of the HMD 18 to be obtained.

The information processing device 16 integrates information from multiple means such as the acceleration sensor 64 and light-emitting section 66, thereby acquiring the position and posture of the user's head more accurately. In some other embodiments of the present disclosure, the acceleration sensor 64 may be omitted. In this embodiment, as mentioned above, the device on which to display images may alternatively be the flat display 16 instead of the HMD 18, or may be both. The flat display 16 may have a generally known structure, so that its internal mechanisms will not be discussed further.

Figure 4:
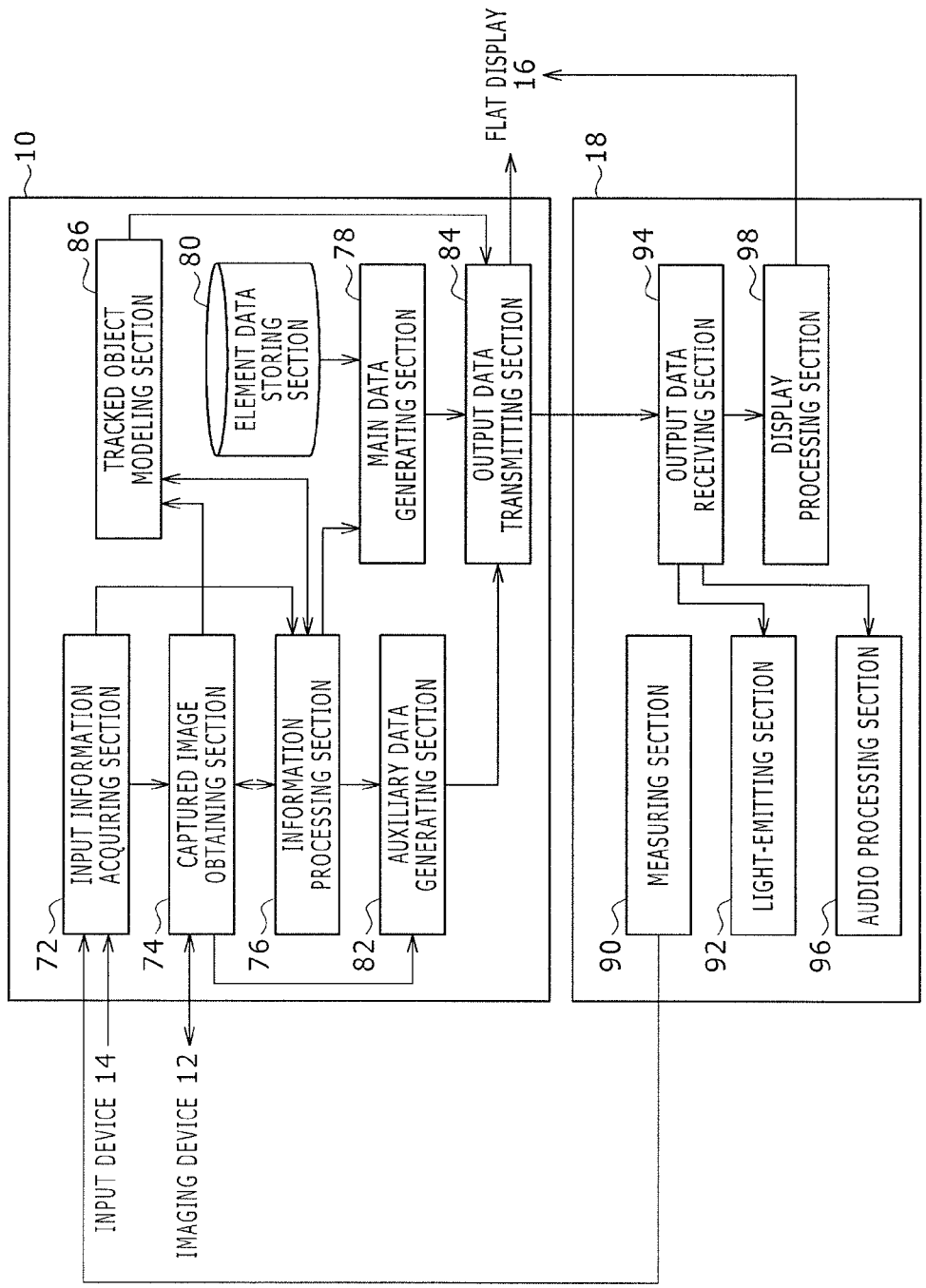
FIG. 4 is a block diagram showing a structure of functional blocks of the information processing device and HMD in this embodiment.

FIG. 4 shows a structure of functional blocks of the information processing device 10 and HMD 18. The functional blocks shown in FIG. 4 may each be implemented in hardware by the CPU, GPU, memories, display, speakers, light-emitting elements, and sensor illustrated in FIGS. 2 and 3. Also, the functional blocks may be implemented in software by the programs that are loaded from recording media or other sources into the memory and that achieve functions of data input, data retention, image processing, and communication, for example. It will thus be understood by those skilled in the art that these functional blocks are implemented diversely in hardware, software, or combinations thereof and are not limited by any of such implementations.

The information processing device 10 includes an input information acquiring section 72 that acquires input information from the input device 14 and HMD 18, a captured image obtaining section 74 that obtains data of a captured image from the imaging device 12, an information processing section 76 that performs information processing in accordance with the executing application such as a video game, a main data generating section 78 that generates data (called the main data hereunder) to be output primarily as a result of the information processing such as game images and sounds, and an element data storing section 80 that stores data necessary for generating the main data. The information processing device 10 further includes a tracked object modeling section 86 that determines an external structure of the tracked object, an auxiliary data generating section 82 that generates data (called the auxiliary data hereunder) to be presented to the user to let the information processing section 76 perform information processing appropriately, and an output data transmitting section 84 that transmits output data to the HMD 18 and flat display 16.

The HMD 18 includes an output data receiving section 94 that receives output data transmitted from the information processing device 10, a measuring section 90 that measures a predetermined physical quantity and sends the measurements to the information processing device 10, a light-emitting section 92 made up of a light-emitting element and a mechanism for controlling the emission of light, a display processing section 98 that permits display of images from out of the output data received by the output data receiving section 94, and an audio processing section 96 that permits output of sounds from out of the output data.

The input information acquiring section 72 acquires the content of the user's operations from the input device 14. In this context, the user's operations may be those of general information processing such as selection of the application to be executed, starting and ending of the processing, and input of commands. After acquiring information from the input device 14, the input information acquiring section 72 supplies the captured image obtaining section 74 or the information processing section 76 with the acquired information in accordance with its content. The input information acquiring section 72 further receives measurements from the measuring section 90 of the HMD 18 and forwards the received measurements to the information processing section 76.

The captured image obtaining section 74 obtains data of moving images including stereoscopic images at a predetermined frame rate. The captured image obtaining section 74 may further control starting and ending of image capture by the imaging device 12 in accordance with a processing start/end request sent from the user and acquired by the input information acquiring section 72. The captured image obtaining section 74 may also control the type of the data to be acquired from the imaging device 12 in accordance with the result of the processing performed by the information processing section 76.

The information processing section 76 processes information such as the video game specified by the user. The information processing includes a process of detecting the target object from captured images and a process of tracking the detected object. The tracking process may include a process in which the position and the posture of the target object are acquired at a predetermined rate. Although the ensuing paragraphs will focus primarily on how the HMD 18 and the input device 14 are tracked by use of their light-emitting markers, this is not limitative of this embodiment of the disclosure.

For example, part of the user's body such as the head or hand may be traced using contour lines. The face or some other target object having a particular pattern may also be traced by pattern matching. Typical image processing techniques may be applied to these tracking processes. In another example, the posture of the HMD 18 may be determined minutely by integrating the information derived from the measurements such as acceleration values sent from the measuring section 90 of the HMD 18. As mentioned above, there are no particular limitations to the content of downstream information processing to be performed by the information processing section 76 in accordance with the result of tracking or in response to the user's operations input through the input device 14.

In keeping with the request from the information processing section 76, the main data generating section 78 generates as main data the data of the images and sounds to be output as a result of information processing. For example, as mentioned above, a virtual world seen from the view corresponding to the position and posture of the user's head is rendered as left and right parallax images. The parallax images may be displayed by the HMD 18 in front of the user's eyes, accompanied by sounds corresponding to the virtual world. This provides the user with a sensation that the user is actually in the virtual world. It is also possible, as will be understood by those skilled in the art, to achieve diverse information processing by use of the result of tracking and the user's operations. The model data and audio data necessary for the main data generating section 78 to generate the main data are stored in the element data storing section 80.

The tracked object modeling section 86 determines an external structure of the object tracked by the information processing section 76 based on an actually captured image. Where the tracked object is a solid object of which the shape and size are already known, the posture of the tracked object is obtained accurately from the apparent shape of the object in the captured image or from the apparent number of multiple markers on the object surface and their apparent positional relationships. The positional relationships are equivalent to those between a 3D model image acquired by projection onto a screen plane in computer graphics and the position and angle of the view that defines the screen plane. In contrast, if what is tracked is an object of which the shape and size vary, it is difficult to determine the posture of the object accurately even through standard model approximation. Under these circumstances, the tracked object modeling section 86 obtains a shape model, i.e., the shape and size of the tracked object from an actually captured image.

To acquire the shape and size of the tracked object with accuracy requires capturing an image of the tracked object in a predetermined direction such as a front image or a lateral image. While an image in that direction has yet to be captured, the tracked object modeling section 86 at least notifies the user to that effect. Alternatively, the tracked object modeling section 86 prompts the user to orient the tracked object in the appropriate direction. As another alternative, the tracked object modeling section 86 may cooperate with the information processing section 76 in carrying out, during the ongoing information processing, a process that guides the tracked object with images or sounds to make it orient itself in the appropriate direction.

Having acquired the shape model of the tracked object, the tracked object modeling section 86 feeds relevant information about the model to the information processing section 76. This allows the information processing section 76 to track the target object accurately. The auxiliary data generating section 82 generates the auxiliary data to be presented to the user so that the information processing section 76 may suitably perform its processing. That is, the auxiliary data includes information which, when recognized by the user, allows the user to improve the circumstances or make necessary input to let the information processing section 76 enhance or stabilize the accuracy of its processing.

For example, the tracked object may move out of the visual field of the camera, or the information processing section 76 may be tracking something other than the target object to be tracked. Such eventualities may deteriorate tracking accuracy or may terminate the tracking process altogether. Moreover, if the imaging device 12 fails or communication is not established between the imaging device 12 and the information processing device 10, the data of the captured image will not be available and the tracking process will not start. Furthermore, excessively high or low brightness of the entire captured image under the current lighting conditions makes it difficult to extract an image of the tracked object and lowers the accuracy of the tracking process.

If information such as a video game is not suitably processed under the above-mentioned circumstances, it may be difficult for the user to determine the cause of the problem. For example, while a virtual world or an application screen is being displayed, the user finds it difficult to determine where the field of view of the camera in the imaging device 12 is directed in the real world. In particular, where the user wears the HMD 18 covering his/her eyes, it is difficult for him/her to determine the positional relationship between himself/herself in the real world and the imaging device 12.

In the case of a hardware trouble, it is no easy task to determine where in multiple devices making up the system or on the connections between them the trouble is from. In addition, the user may not become aware of the environment conducive to incorrectly detecting the tracked object, such as when illuminations whose color or shape is the same as that of the light-emitting markers are found within the field of view of the camera, or when the lighting in use is too bright or too dark.

However, these irregularities often depend on the environment or the user himself/herself. That means there are limits to overcoming the trouble by resorting to hardware or software measures taken on the imaging device 12 or on the information processing device 10. Given the circumstances, this embodiment supplements the main data with the auxiliary data in the form of some intermediate data indicative of how the information processing device 10 currently recognizes the real space, thereby prompting the user to become aware of the trouble. Alternatively, the embodiment may keep the user aware of the appropriate state so as to forestall irregularities from the beginning.

Specifically, the image acquired by the information processing device 10 may be displayed, or an image of the tracked object being marked may be extracted from the captured image and displayed. If the information processing device 10 loses track of the target object or if the tracked object moves out of the field of view of the camera, the captured image being displayed may be varied noticeably, accompanied by warning sounds. Also, the correct direction in which the object should return may be displayed by an arrow or announced by voice. If a surround audio system is in use, a sound may be generated at a suitable position to indicate where the object should return to. If multiple candidates to be tracked have been detected, an image may be displayed through which the selection of the desired object is input.

Any one of the above-described modes in which the auxiliary data is presented may be implemented, or two or more of these modes may be implemented in combination. In order to generate the auxiliary data, the auxiliary data generating section 82 obtains captured images from the captured image obtaining section 74 and the result of tracking from the information processing section 76 as needed. If the imaging device 12 is in the form of a stereo camera, it is preferable to obtain the data of stereoscopic images captured by the left and right cameras so as to display the two images as the auxiliary data.

The auxiliary data may be presented in an initial process before the information processing section 76 starts the principal processing such as a game or may be presented in parallel with the principal information processing. If the auxiliary data is presented as an image, that image may be superimposed on a partial region of the main data image such as the game image, or may be displayed in a region separate from the main data image. As another alternative, the auxiliary data may be presented in response to the user's request for such presentation through the input device 14, for example. As a further alternative, the auxiliary data may be utilized by programmers when they debug programs defining the information processing by the information processing section 76.

The output data transmitting section 84 acquires successively the main data generated by the main data generating section 78 and the auxiliary data generated by the auxiliary data generating section 82 and, after reshaping the acquired data as needed, supplies the data to at least either the HMD 18 or the flat display 16. Where the auxiliary data image and the main data image are to be displayed together, the output data transmitting section 84 may generate an image in which the auxiliary data image is pasted or superimposed on the main data image and transmit the generated image to the HMD 18, for example. Alternatively, the output data transmitting section 84 may transmit the main data image and the auxiliary data image in relation to each other on the premise that the two images are later reshaped inside the HMD 18.

Furthermore, in accordance with a request from the tracked object modeling section 86, the output data transmitting section 84 supplies at least either the HMD 18 or the flat display 16 with the data representative of the information to be presented to the user when the tracked object modeling section 86 acquires the shape model of the tracked object.

The output data receiving section 94 of the HMD 19 receives output data from the information processing device 10. The output data includes at least either the image and sound of the main data or the image and sound of the auxiliary data. Alternatively, the main data image may include the data of an image in which the auxiliary data image is superimposed on the main data image. While the shape model of the tracked object is being acquired, the output data includes the data of images and sounds for notifying the user of necessary information. The output data receiving section 94 feeds the image data to the display processing section 98 and the sound data to the audio processing section 96.

In turn, the display panel included in the display processing section 98 outputs images, and the speakers or like components included in the audio processing section 96 output sounds. In the mode in which the main data image and the auxiliary data image to be displayed together are transmitted individually from the information processing device 10, the display processing section 98 generates and displays an image in which the auxiliary data image is pasted or superimposed on the main data image. The display processing section 98 may further extract part of the image thus generated and transmit the data of the extracted image to the flat display 16.

The measuring section 90 includes the acceleration sensor 64 shown in FIG. 3, and transmits measurements of the sensor to the information processing device 10. The light-emitting section 92 includes the light-emitting section 66 shown in FIG. 3 and causes the latter section to function as a light-emitting marker emitting light in a predetermined color. The color of emitted light may be selected by the information processing device 10. In this case, the output data receiving section 94 acquires the data about the emitted-light color selection from the information processing device 10 and notifies the light-emitting section 92 of the acquired data. For example, the color of emitted light may be varied in accordance with the user identification information. The varying colors of emitted light allow the heads of multiple users to be distinguished from one another. The information processing device 10 may also specify the color of light emitted by the marker attached to the input device 14.

Figure 5:
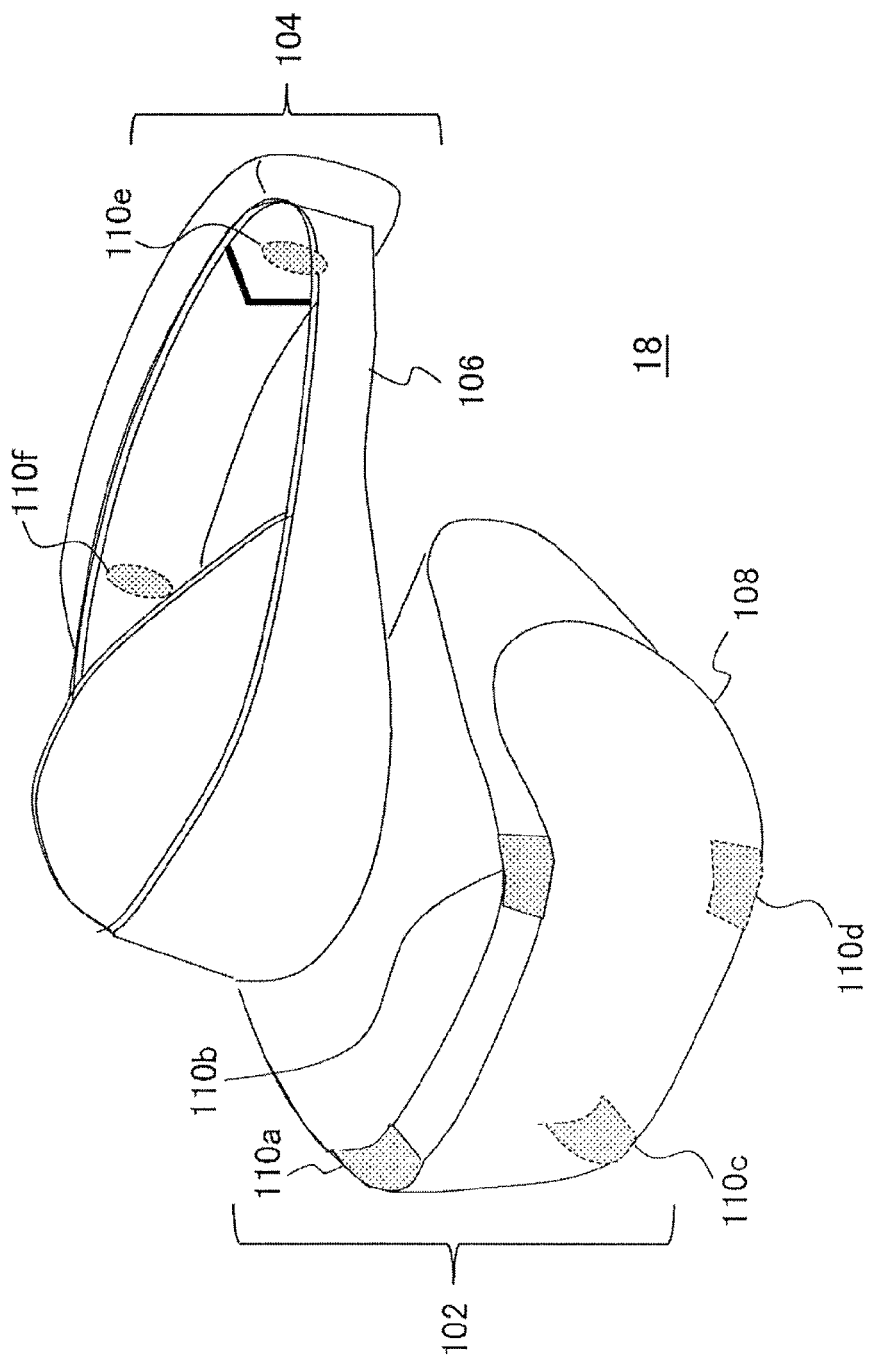
FIG. 5 is a schematic diagram showing the appearance of the HMD in this embodiment.

FIG. 5 shows the appearance of the HMD 18. In this example, the HMD 18 is made up of an output mechanism section 102 and a wearing mechanism section 104. The wearing mechanism section 104 includes a wear band 106 worn by the user around the head to secure the device. The wear band 106 is made of a material adjustable in length to the circumference of the user's head or has such a structure. For example, the wear band 106 may be formed by an elastic body such as rubber or may employ a buckle or gear arrangement.

The output mechanism section 102 includes an enclosure 108 shaped to cover the user's eyes when the HMD 18 is worn by the user. Inside the enclosure 108 is a display panel facing both eyes when the device is worn. Outside the enclosure 108 are light-emitting markers 110a, 110b, 110c, and 110d. Although the number of light-emitting markers and their locations are not limited, four light-emitting markers are arranged at the four corners of the enclosure front of the output mechanism section 102 in this embodiment. Light-emitting markers 110e and 110f are also arranged on both sides at the back of the wear band 106. The light-emitting markers 110c and 110d under the output mechanism section 102 and the light-emitting markers 110e and 110f outside the wear band 106 are not seen from the view of FIG. 5 and are thus indicated with broken lines depicting the circumferences of each marker.

Figure 6:
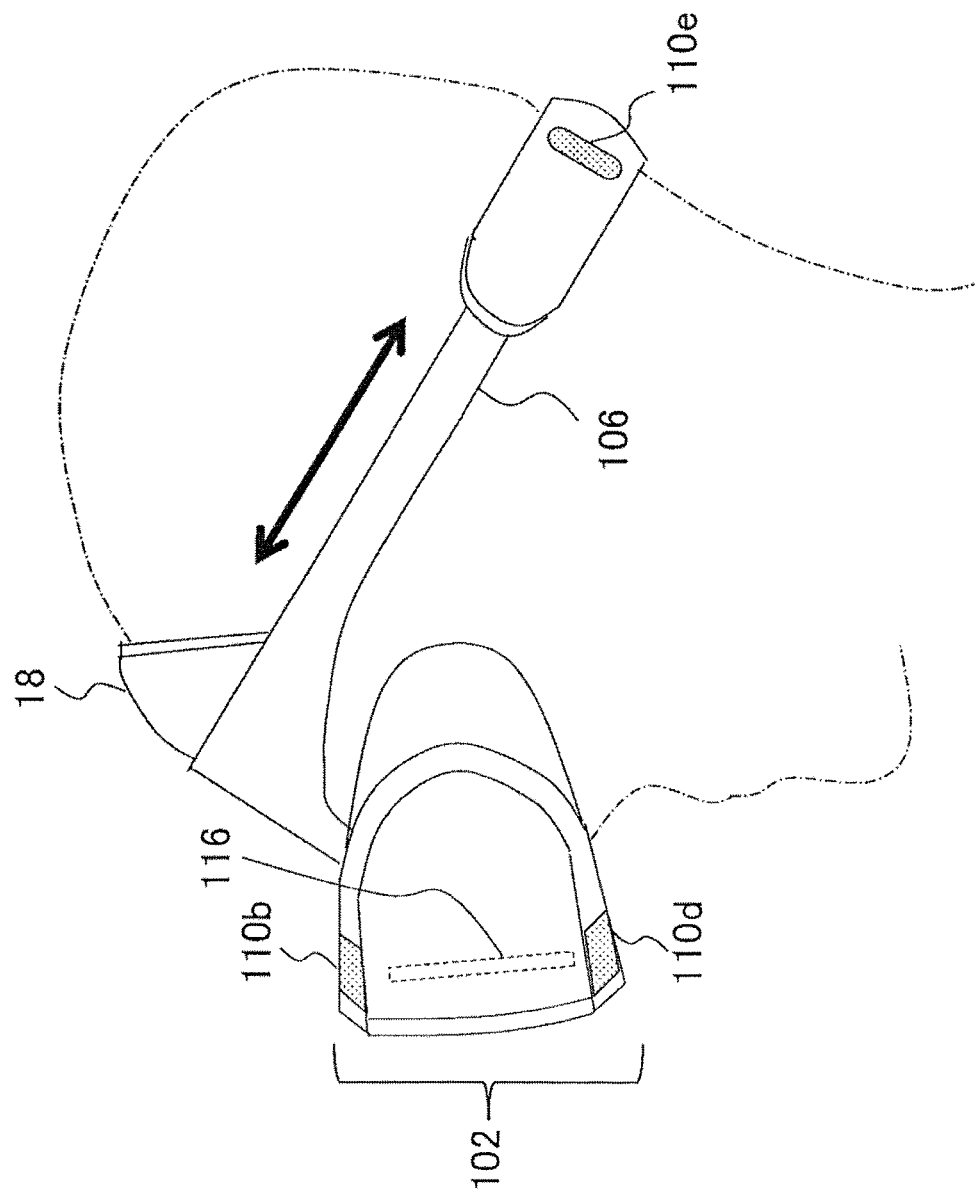
FIG. 6 is a side view showing laterally how the HMD illustrated in FIG. 5 is worn by a user.

FIG. 6 shows laterally how the HMD 18 illustrated in FIG. 5 is worn by the user. As described above, inside the output mechanism section 102 are a display panel 116 and other circuits shown in FIG. 3. Outside the output mechanism section 102 are the light-emitting markers 110b and 110d. Further, the light-emitting marker 110e is located laterally at the back of the wear band 106. When the HMD 18 is viewed from the left side as illustrated, three light-emitting markers 110b, 110d and 110e are visible.

With the light-emitting markers arranged as described above, when the user wearing the HMD 18 faces the imaging device 12, four light-emitting markers 110a, 110b, 110c, and 110d are captured; when the user wearing the HMD 18 is looking sideways, three light-emitting markers (e.g., 110b, 110d, and 110e) are captured; when the user wearing the HMD 18 is looking back, two light-emitting markers 110e and 110f are captured. If the user's head is oriented somewhere in between these positions, the user's head orientation would be uniquely determined by the known arrangement of the light-emitting markers on the HMD 18 in terms of the rotation angle around the user's body axis, i.e., the relationship between the yaw angle, and the apparent number of light-emitting markers and their positional relationships.

Using the above-mentioned relationship makes it possible to determine the angle of the user's head oriented in any direction around the body axis based on the number of light-emitting marker images and their positional relationships in the actually captured image. As with the yaw angle, the angle variation (pitch angle) of the user looking up or down and the angle variation (roll angle) of the user tilting the head are also determined by the number of light-emitting marker images and their positional relationships. As a result, the user's head posture is determined in all directions.

It should be noted that the HMD 18 in this embodiment keeps the wear band 106 adjustable in length as indicated by arrows. The adjustment can thus affect the distance between the light-emitting markers at the front of the output mechanism section 102 (e.g., 110b and 110d) and the light-emitting marker at the back of the wear band (e.g., 110e). In order to calculate the posture of the HMD 18 from the apparent number of light-emitting markers and from their positional relationships, it is preferable to accurately obtain the shape model of the HMD 18 including the arrangement of the light-emitting markers after the wear band 106 is adjusted in length.

The tracked object modeling section 86 of the information processing device 10 thus acquires the shape model of the HMD 18 worn by the user on the basis of the actually captured image. As described above, the tracked object modeling section 86 basically obtains the shape model of the tracked object in accordance with the image captured of the tracked object in a predetermined direction. Where the HMD 18 is the tracked object, whether the object is oriented in the appropriate direction is determined by the number of simultaneously imaged markers.

In view of the elasticity of the wear band 106, the distance between two light-emitting markers at the front and one light-emitting marker at the back is determined by acquiring an image in which the three light-emitting markers are captured together. In practice, a standard model of the HMD 18 may be prepared beforehand just like the object model in computer graphics, and then the model may be modified based on the actually captured image.

The distance will also be determined where the positions or distances other than those involved with the wear band 106 are made adjustable, such as up-down adjustment of the output mechanism section 102. The tracked object modeling section 86 may acquire the shape model in an initial process before the information processing section 76 starts the principal processing such as a game, or may obtain or modify the shape model periodically or in parallel with the ongoing principal information processing. If the shape model is modified repeatedly using images acquired at different points in time, a highly reliable shape model may be eventually acquired. If the shape model is acquired continuously during the ongoing principal information processing, posture variations of the wear band 106 such as slacking of the band caused by game-related head movements and subsequent retightening may be factored in for tracking processing.

The shape of the HMD 18 is not limited to what is shown in FIG. 5 or 6. For example, multiple wear bands may be provided to facilitate the adjustment and securing of the device. The band may also be formed as eyeglass temples so as to be worn and removed easily. If the information processing does not envisage the user looking back, the light-emitting markers are not necessary at the back of the wear band. In this case, the positional relationships of the other light-emitting markers remain unchanged regardless of the elasticity of the wear band 106. This eliminates the need for processing performed by the tracked object modeling section 86.

Figure 7:
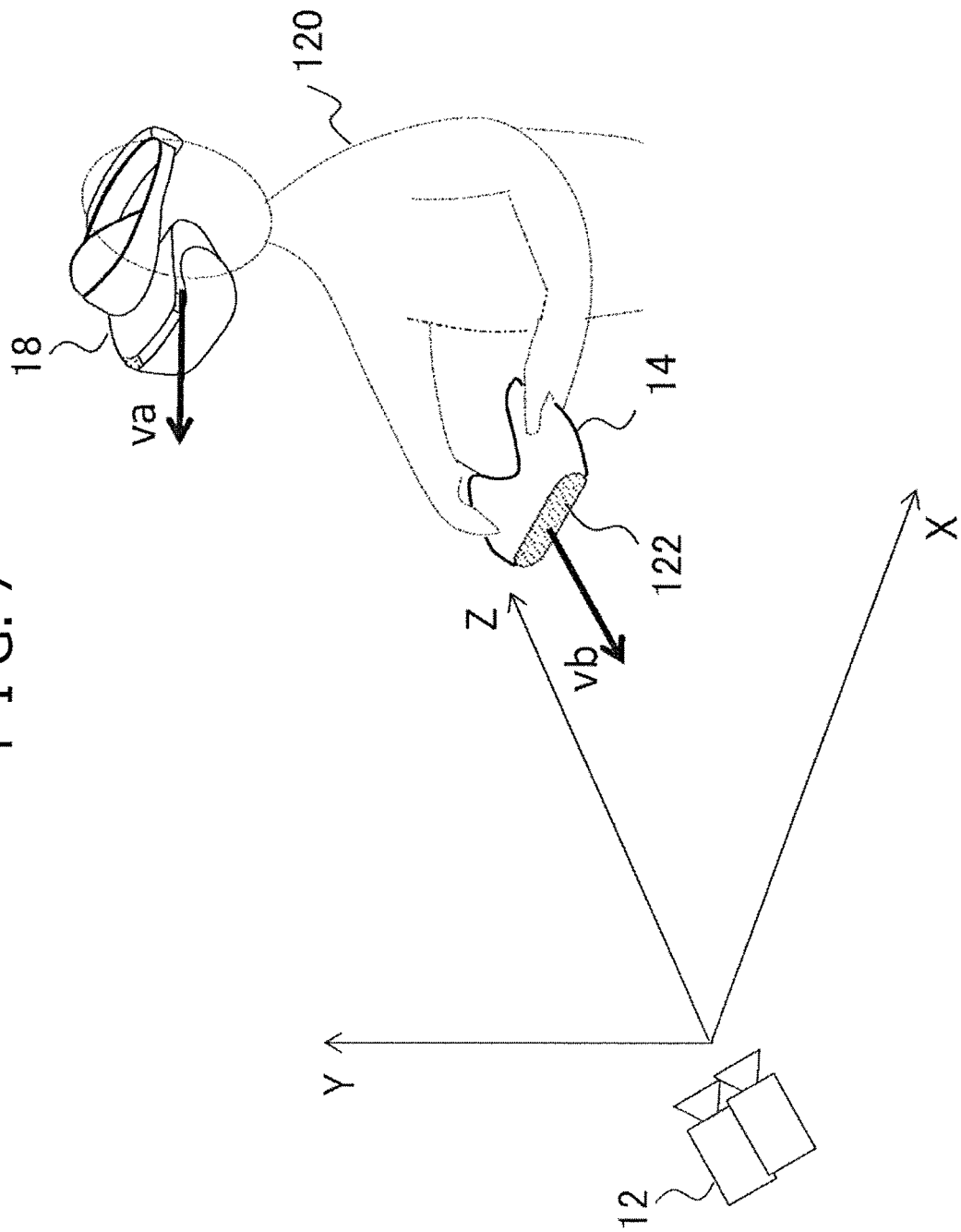
FIG. 7 is an explanatory diagram explaining how information is obtained from a captured image in this embodiment.

FIG. 7 explains how information is obtained from a captured image in this embodiment. In FIG. 7, a user 120 indicated by dashed lines is holding the input device 14 while wearing the HMD 18. The input device 14 has a light-emitting marker 122 facing the imaging device 12 when held in a manner suitable for the user's operation. The light-emitting marker of the HMD 18 is structured as shown in FIGS. 5 and 6. Where the imaging device 12 functions as a stereo camera, the parallax between stereoscopic images is used as the basis for obtaining distance Z between the image plane of the imaging device 12 and each light-emitting marker. The position of a given light-emitting marker image on the image plane (X-Y plane) in either of the acquired stereoscopic images represents the apparent position of that marker viewed from the imaging device 12.

Integration of these pieces of information, specifically back projection of the position of each light-emitting marker on the X-Y plane by use of distance Z from the imaging device 12, makes it possible to acquire the position of that marker in the real 3D space. Also, the number of light-emitting markers of the HMD 18 and their positional relationships permit acquisition of the posture of the HMD 18 in the real space (vector va) as mentioned above. The shape of the light-emitting marker 122 of the input device 14 allows the posture of the input device 14 to be obtained in the real space (vector vb).

On the basis of the positions and postures of these devices in the real space, the information processing section of the information processing device 10 represents how the field of view changes in a virtual world in keeping with the user's face orientation or how the object moves in the image in accordance with the movement of the input device 14. Where the distance from the imaging device 12 is to be estimated by use of the apparent marker size or where the information processing has no need for movements in the depth direction, the imaging device 12 does not need to be the stereo camera. The same holds where a distance measuring technique that uses reference light is implemented. It is not required to track both the HMD 18 and the input device 14.

Explained below are the workings of the information processing device 10 and the HMD 18 or the flat display 16 achieved by the above-described structures. FIG. 8 is a flowchart showing steps of carrying out information processing on a captured image and displaying the processed image in this embodiment. The flowchart starts when the user typically operates the input device 14 to request the information processing device 10 to start processing.

First, the captured image obtaining section 74 of the information processing device 10 requests the imaging device 12 to start capturing images and obtains the data of the images captured and output by the imaging device 12 (step S10). The tracked object modeling section 86 then acquires the shape model of the tracked object (step S12). Specifically, as discussed above, the object tracked in a predetermined direction is captured, and the shape and size of the object are determined based on the image. There may be a single or a plurality of predetermined directions in which the object is tracked. Such directions may be determined in accordance with the varying location of the tracked object or defined in a manner compensating the lacking angle during the shape model being formed. If the HMD 18 is the tracked object, an approximate model of the object may be prepared as discussed above. The approximate model is then modified in a manner reflecting the elasticity of the wear band 106 on the basis of the lateral image captured.

If the target object is an unknown object, the shape model of the object can be acquired by prompting the user to orient each of the faces of the object toward the imaging device 12, for example. The actual size of the object is obtained on the basis of its position in the depth direction acquired from stereoscopic images. If an acceleration sensor is internally provided as in the case of the HMD 18, it is possible to verify whether the image in the required direction is captured on the basis of the tilt of the tracked object when it was captured. The tracked object modeling section 86 transmits the output data representative of the information to be presented to the user regarding the process of shape model acquisition, to at least either the HMD 18 or the flat display 16 via the output data transmitting section 84 so that the information is output from the destination device.

The process of step S12 may be performed continuously or intermittently as explained above. The information processing section 76 then acquires, on the basis of the acquired shape model, the position and posture of the target object in the real space using stereoscopic images (step S14). Given the results of these processes, the main data generating section 78 generates the main data to be output such as the images and sounds of the virtual world (step S16). If the HMD 18 is used to display the main data, additional processes may be carried out as needed, such as generating the left and right parallax images, and distorting the images so that they are viewed normally through lenses.

Meanwhile, the auxiliary data generating section 82 generates the auxiliary data to be output (step S18). The captured image may simply be used as the auxiliary data. Alternatively, the captured image may be processed by marking the position of the target object identified as a result of tracking by the information processing section 76. As another alternative, image and/or sound data may be generated to announce an abnormality or to suggest measures for improvement. As a further alternative, a signal may be generated to activate a vibrator incorporated in the input device 14.

The output data transmitting section 84 of the information processing device 10 transmits the main data and auxiliary data thus generated to at least either the HMD 18 or the flat display 16, causing the images to be displayed and the sounds to be output (step S20). The output data may be transmitted to the flat display 16 via the HMD 18. In this case, the display processing section 98 of the HMD 18 reshapes the data being displayed on the display processing section 98 into a format suitable for the flat display 16. As long as a process termination request is not input from the user (N in step S22), steps S14 through S20 are repeated on the image captured as the next image frame. If the user requests termination of the process, the entire processing is terminated (Y in step S22).

FIGS. 9A and 9B show exemplary images displayed according to this embodiment. FIG. 9A shows exemplary images where auxiliary data is not displayed, i.e., images included in the main data. The left subfigure in FIG. 9A is the image for the HMD 18 and the right subfigure is the image for the flat display 16. Although these subfigures depict a checkered pattern as the object to be displayed, what is actually displayed significantly depends on the content of information processing, ranging from virtual worlds to game images. The display image for the HMD 18 is formed by a right-eye-use image and a left-eye-use image arranged on the left and right equal-size regions making up the image plane corresponding to the display panel.

The above example presupposes that lenses are positioned in front of the display panel to widen the user's view. In this case, the lenses will incur what is called pin-cushion distortion in which the farther the pixels are located from the center of the displayed image, the more displaced and stretched these pixels become. Moreover, chromatic aberration stems from the displacement that varies from one color to another. Thus the common image shown in the right subfigure of FIG. 9A is subjected to distortion correction in view of pin-cushion distortion and chromatic aberration. Such correction yields the display image for the HMD 18 as illustrated. Seen through the lenses, the display image for the HMD turns out to be what is shown in the right subfigure.

The distortion correction may be performed either by the main data generating section 78 of the information processing device 10 or by the display processing section 98 of the HMD 18. In the structure where the image data is forwarded from the HMD 18 to the flat display 16, the display processing section 98 of the HMD 18 extracts a necessary region from either the right image or the left image and transmits the extracted image region. Where the information processing device 10 transmits the distortion-corrected image to the HMD 18, the display processing section 98 subjects the received image to inverse distortion correction so as to generate the image for the flat display 16. The distortion correction for lenses and the inverse distortion correction may be implemented using known techniques.

FIG. 9B shows exemplary images where auxiliary data is displayed. The left subfigure in FIG. 9B shows the image for the HMD 18 and the right subfigure indicates the image for the flat display 16. In contrast to the images in FIG. 9A, each of the images in FIG. 9B includes two smaller images (e.g., 150*a* and 150*b*) side by side around the middle of the images. They are stereoscopic images captured by the imaging device 12, showing the user illustrated in FIG. 7. The stereo camera arrangement includes two cameras each having the unique view. This enables both stereoscopic images to be displayed together as the auxiliary data, allowing the user to verify the two views and easily recognize an effective tracking range for the tracking process.

If a failure of one of the two cameras results in faulty data output, individually verifying the stereoscopic images allows the user to find the abnormality at a glance. If the lighting environment or other imaging conditions are not appropriate, verifying the captured images allows the user to grasp the situation easily. Where the imaging device 12 is made of a monocular camera or where the information processing has no need for stereo matching, only one captured image needs to be included in the auxiliary data.

The images for the HMD 18 on which the auxiliary data images are superimposed may be generated using one of the following two techniques for example:

(1) After main data images are rendered from the left and right views, rectangular auxiliary data images are additionally rendered at the very front of the two images and subjected to distortion correction.

(2) Auxiliary data images are pasted as a texture onto the surface of the object in a virtual world rendered as the main data, before the virtual world is rendered from the left and right views and subjected to distortion correction.

Where technique (1) is adopted, the auxiliary data images are seen as common flat images. However, the closer the pixels are to the edges of the left and right images, the greater the effect of distortion correction, so that image quality tends to deteriorate. If the image for the flat display 16 (shown in the right subfigures) is extracted from the images for the HMD 18 generated by this technique, inverse distortion correction becomes progressively ineffective toward the image edges. The initial rectangular captured images thus become increasingly difficult to reconstitute at their edges. In view of these characteristics, in particular, if technique (1) is employed, the auxiliary data images are preferably displayed around the center of the main data image. This reduces the possibility of the extracted auxiliary data image partially dropping.

Where the auxiliary data images are displayed around the center of the main data image, it is preferred that the auxiliary data be displayed at a suitable time such as during the initial processing, or that the user be able to switch between display and non-display of the auxiliary data so that the main data image is not be hidden inappropriately. Where technique (2) is adopted, the auxiliary data images are part of the virtual world, so that they can be seen naturally through lenses with minimum image deterioration from distortion correction. When the image for the flat display 16 is generated from the image for the HMD 18, the resulting image is subjected to inverse correction as in the virtual world, so that the above-mentioned abnormality experienced with technique (1) is unlikely to arise.

FIG. 10 explains how the views and stereoscopic images of the stereo camera in the imaging device 12 are related. Cameras 152*a* and 152*b* in the imaging device 12 each have the view indicated by broken lines. The user in state A (in FIG. 10) is found included in the two views, so that stereoscopic images 154*a* and 154*b* shown on the right are obtained. The image 154*a* is captured by the camera 152*a* having the left view, and the image 154*b* is captured by the camera 152*b* having the right view.

In state B (in FIG. 10), the user moves left (right when viewed from the camera) to enter the field of view of the camera 152*b* on the right but leave the field of view of the camera 152*a* on the left. In this state, the user's image is partially disappearing from an image 156*a* captured by the camera 152*a* with the left view. Where the position of a limit-emitting marker attached to the HMD 18 worn by the user or to the input device 14 gripped by the user is to be acquired, marker images as seen from the left and right views are necessary. Accordingly, the position cannot be acquired during state B.

However, the user wearing the HMD 18 and immersed in a virtual world or like environment is often unable to notice the abnormality. Where the stereoscopic images 156*a* and 156*b* are both displayed as the auxiliary data as described above, the user's disappearance from the field of view of either of the cameras is readily recognizable at a glance. A defective camera or faulty data input from any of the cameras is still recognized because the screen is turned off. The captured images may be displayed either unmodified or mirror-reversed. If such mirror reversion is performed, the user can easily understand the direction to return to after the disappearance from the field of view of the camera.

FIGS. 11A and 11B show an example in which captured images are processed to provide auxiliary data. In FIGS. 11A and 11B, the stereoscopic images in state B shown in FIG. 10 are each mirror-reversed. Images 158*a* and 160*a* captured from the left view are shown on the right, and images 158*b* and 160*b* captured from the right view are shown on the left. This allows the user to view as if in a mirror his/her images from the left and right cameras, offering an easy understanding of the space. In FIG. 11A, the entire captured image 158*a* partially disappearing from the field of view of the camera is subjected to a predetermined image treatment for highlighted display. In FIG. 11A, the entire image is shown overlaid with a translucent grey layer. Alternatively, the image may be further highlighted in red, for example, or the overlaid layer may be caused to blink.

In response to these changes, the user can move back into the field of view of the corresponding camera. This prevents disruption of the tracking process and allows the information processing to continue. In FIG. 11B, an arrow 162 is drawn in the captured image 160*a* partially disappearing from the field of view, indicating the direction to return to. The user can easily move back into the field of view of the camera by moving in the arrowed direction. If a stereoscopic view is available with the HMD 18, parallax images of the arrow may be generated and displayed on the left and right regions of the display panel. This allows the arrow to be viewed as if floating in the air.

As another alternative, a sound may be generated at a suitable position to indicate the direction to return to. In this case, the user can move back into the field of view of the camera by moving in the direction of the sound. As a further alternative, a vibrator in the input device 14 partially disappearing from the field of view of the camera may be activated to warn the user. Any one of the above-described modes for auxiliary data output may be implemented singly, or two or more of these modes may be implemented in combination.

Figure 12:
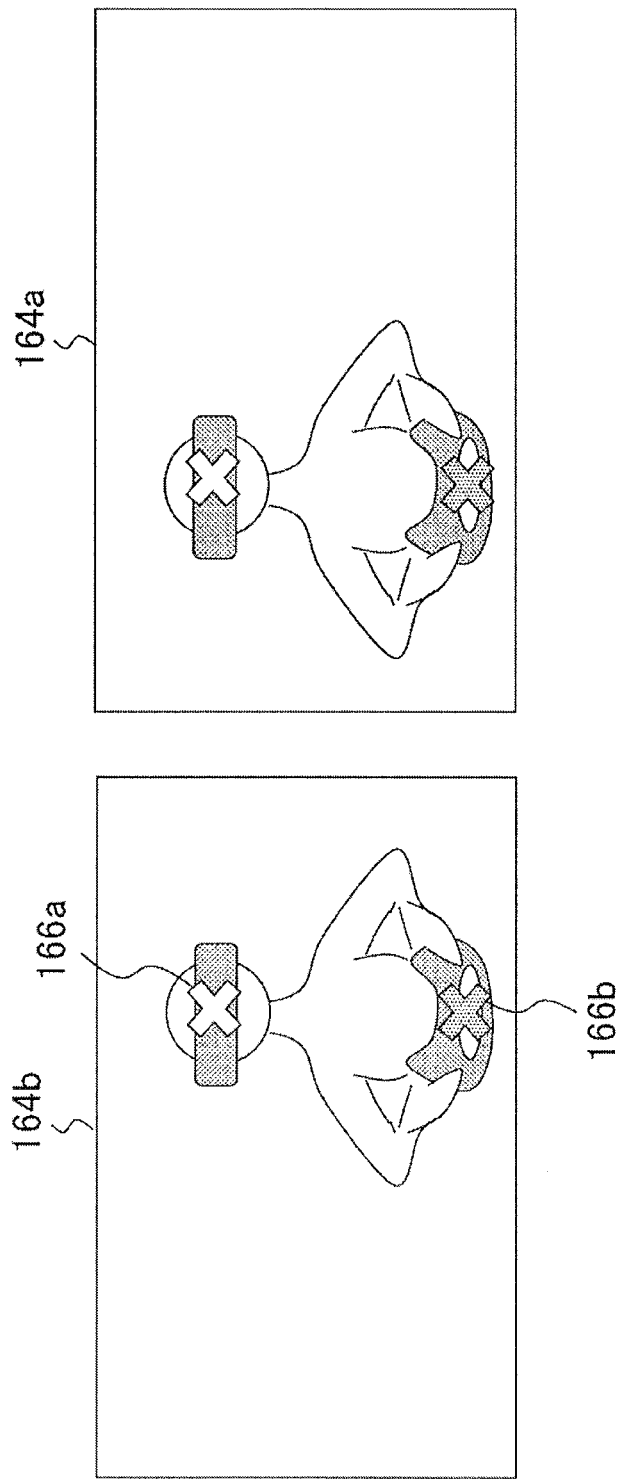
FIG. 12 is a schematic diagram showing another example in which captured images are processed to provide auxiliary data in this embodiment.

FIG. 12 shows another example in which captured images are processed to provide auxiliary data. In this example, the information processing section 76 of the information processing device 10 draws a marking or a figure identifying the position on the screen of the object recognized as the tracked object. If the tracking process is in progress, the corresponding marking or figure moves in keeping with the moving object. In FIG. 12, stereoscopic images 164a and 164b show cross markings (e.g., 166a and 166b) each at the center of the HMD and the input device, indicating that the tracked objects are accurately recognized.

Where multiple objects, such as the HMD and the input device or the HMDs of multiple users, are being tracked, their identifying markings may be varied in color so that the objects may be recognized in a manner distinguished from one another. For example, the light-emitting markers are made different in color so that the relation objects provided with the same colors as the light-emitting markers may be tracked in a manner distinguished from each other. With such relation between light-emitting markers and markings in place, it will be easier to recognize situations where one tracked object is being mistaken for another tracked object.

The markings are not limited to crosses. Any suitable figures may be used as markings. The tracked object(s) may be encircled by lines. Where there are multiple users, text information such as login names may be shown near each of the images of their HMDs 18. Such measures allow the user to verify at a glance whether the tracked object is within the field of view of the camera or whether the tracking process is being carried out normally. For example, if the HMD to be tracked is not marked or if the HMD is marked in a color different from that of its light-emitting markers, then the tracking process is considered to be the cause of the abnormality in information processing.

FIG. 13 explains how the situation explained in FIG. 12 improves. An image 168 is one of the stereoscopic images displayed as the auxiliary data. In the image 168, as in FIG. 12, the objects recognized by the information processing section 76 as the tracked objects are marked with crosses 170a and 170b. The cross marking 170a indicates the image position of the HMD as the true tracked object, whereas the cross marking 170b shows that a ceiling light fixture is being erroneously recognized as a tracked object. This can happen when the light-emitting marker has a color similar to that of the lighting. The same phenomenon can occur when a TV set or the display of a mobile terminal is incorrectly recognized as a tracked object.

By having the auxiliary data such as the image 168 displayed, the user can easily find the cause of the abnormality. In this example, the user may notice that the camera is directed higher than expected and may take hardware measures such as lowering the elevation angle of the camera to reduce the range of light entering the field of view. Alternatively, the user may have a movable cursor 172 superimposed on the image 168 using the input device 14 for example and receive input of the selection of the cross marking 170a indicative of the correct tracked object. In this case, the information processing section 76 excludes the object corresponding to the unselected cross marking 170b as an erroneously tracked object, thus correcting the faulty recognition on a software basis without changing the field of view of the camera.

If the cross marking is not displayed on the true tracked object, the absence of the cross marking clearly indicates that the object is not recognized as a tracked object. In such a case, the user may temporarily bring the tracked object close to the camera for easier recognition. It is also conceivable that unexpected objects, such as furniture, may have entered the field of view of the camera, hiding the tracked object. In this case, the cause of the abnormality is easily identified when the auxiliary data such as the image 168 is displayed. The user then need only remove the obstacles or readjust the orientation of the camera to keep the obstructions out of its field of view.

Figure 14:
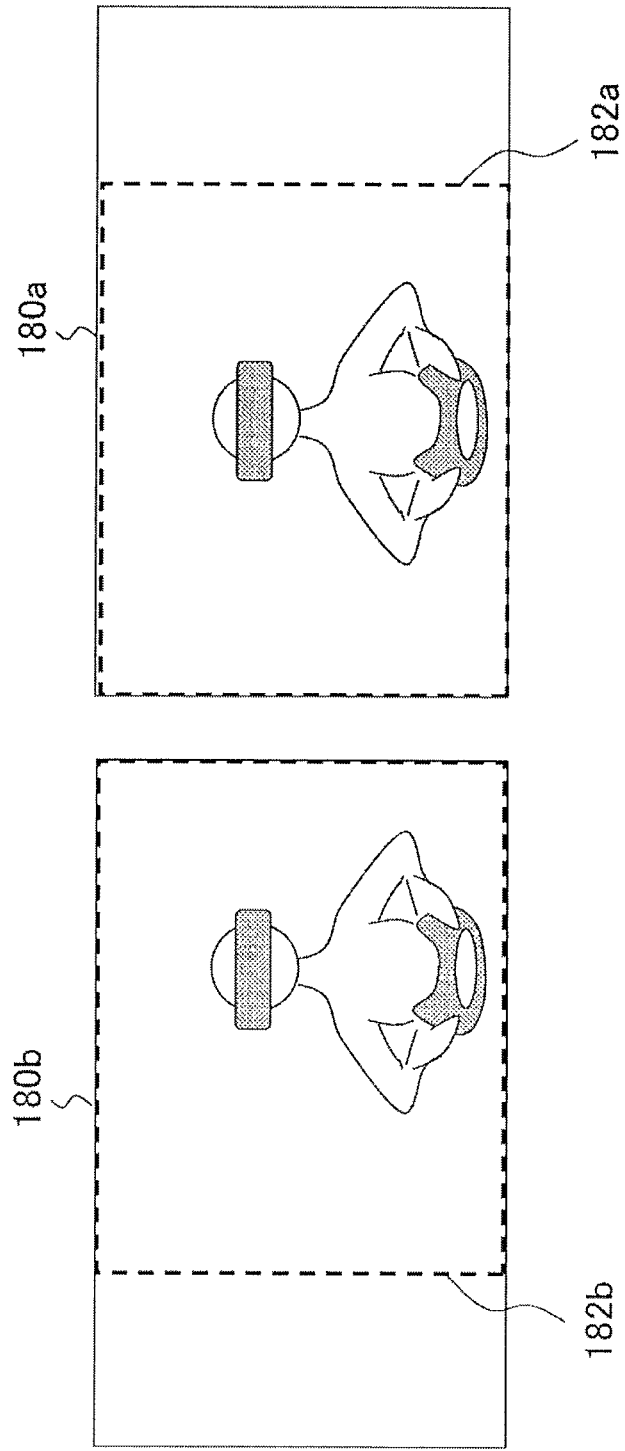
FIG. 14 is a schematic diagram showing still another example in which captured images are processed to provide auxiliary data in this embodiment.

FIG. 14 shows still another example in which captured images are processed to provide the auxiliary data. In this example, stereoscopic images 180a and 180b are shown overlaid respectively with broken-line regions 182a and 182b each indicating the user's movable range defined by the field of view of the other camera. That is, the limit of the field of view of the camera with the left view is displayed as the broken-line region in the image 180b from the camera with the right view. The limit of the field of view of the camera with the right view is displayed as the broken-line region in the image 180a from the camera with the left view. It should be noted that the stereoscopic images 180a and 180b are mirror-reversed so that the field of view of the camera with the left view is shifted right and that the field of view of the camera with the right view is shifted left.

Displaying such auxiliary data allows the user to accurately recognize his/her movable ranges in accordance with the actual camera conditions; the user's movable ranges are not defined clearly in the real space. Display of the user's movable ranges is not limited to the use of broken lines. Alternatively, only the regions of the movable ranges may be extracted from the captured images and displayed. In each of the states shown in FIGS. 11A, 11B, 12, 13 and 14, the user's movable ranges may be displayed by taking the above-described measures either singly or in combination. The output of sounds or the vibration of the input device 14 may be additionally included as needed in the measures taken.

FIG. 15 is a flowchart showing the procedure for acquiring the shape model of the tracked object, the procedure being performed in step S12 of FIG. 8 by the tracked object modeling section 86 of the information processing device 10. Although the shape model of the HMD 18 is assumed to be acquired here, the tracked object is not limited to the HMD 18. In this example, as described above, the standard model of the device may be prepared beforehand and held in an internal memory of the tracked object modeling section 86.

At the initial stage of processing, the tracked object modeling section 86 notifies the user that the images showing the markers necessary for shape model acquisition are being obtained (step S30). Images of the light-emitting markers are then detected from the image frame at a given point in time of the captured image (step S32). At the initial stage, typically at the start of information processing, the user most often faces the imaging device 12, causing images of the four light-emitting markers at the front of the HMD 18 to be detected. It is then determined whether the number of simultaneously imaged markers is as expected (step S34).

In the case of the HMD 18, adjusting the length of the wear band 106 can affect the distance between two light-emitting markers at the front on the one hand and one light-emitting marker at the back on the other hand, as mentioned above. These three light-emitting markers need to be captured together under such conditions. If the number of detected light-emitting markers is not as expected (e.g., four markers detected; N in step S34), the light-emitting markers are again detected and their number verified from the next image frame (steps S32 and S34). During this time, the notification in step S30 continues.

At this moment, the user may be notified, in text for example, that the necessary images are being obtained or may be prompted to turn his/her head in a predetermined direction. Alternatively, during processing by the information processing section 76, there may be provided in advance a mode for obtaining necessary images, i.e., a mode in which the user spontaneously faces the suitable direction amid in-game or virtual-world representations. For example, in-game images may display in their rightmost position an object to be gazed at by the user, causing the user to turn his/her head right. This allows the user's left head side to enter the field of view of the imaging device 12, causing an image indicative of three light-emitting markers to be obtained.

In that case, the tracked object modeling section 86 may request the information processing section 76 to execute such mode for image capture, or may output sounds at a suitable position to indicate the direction to which the user should turn. When the image displaying the necessary number of light-emitting markers (e.g., three markers) is obtained (Y in step S34), the user is notified that the next stage is initiated, i.e., that the shape model is now being acquired (step S36). The shape model is acquired on the basis of the positional relationships of the light-emitting marker images in the obtained image (step S38). If the standard model of the HMD 18 is already prepared, that model is modified.

In order to acquire the shape model as accurately as possible, steps S32 and S34 may be repeated until images of both the right side and the left side of the HMD 18 are obtained. In this case, in addition to the number of captured light-emitting markers, the arrangement of these markers can be verified to distinguish the right-side image from the left-side image. In the image-capturing environment such as that shown in FIG. 13, the presence of ambient light-emitting bodies such as lighting fixtures with a color similar to that of the light-emitting markers of the HMD 18 may accidentally provide three light-emitting object images. Obtaining the shape model based on such images can result in an enormous error. To avoid such eventualities, how the markers of the HMD 18 are illuminated may be varied to make distinction from the ambient light-emitting bodies at least while images are being captured to obtain the shape model.

For example, images may be captured without the markers of the HMD 18 being illuminated so that the light-emitting bodies other than the markers are detected in the field of view of the camera. With such light-emitting bodies detected, the markers of the HMD 18 are illuminated in a color different from the colors of the light-emitting bodies. Alternatively, the light-emitting markers may be caused to blink. The information for specifying the emitted-light color or specifying whether or not to blink the light is generated by the tracked object modeling section 86 and transmitted to the HMD 18 via the output data transmitting section 84. The transmitted information causes the limit-emitting section 92 of the HMD 18 to provide illumination as specified. After the shape model is acquired or modified, the tracked object modeling section 86 offers the information about the shape model to the information processing section 76, notifies the user that the process of shape model acquisition is complete, and terminates the processing (step S40).

Alternatively, as mentioned above, the tracked object modeling section 86 may obtain the shape model in parallel with information processing being carried out by the information processing section 76. This mode is implemented in one of two cases: either the information processing is started while an image showing the predetermined number of markers has yet to be obtained, or the already acquired shape model is modified continuously to allow for the varying length of the wear band or to further improve the precision of the model. In the first case, only the light-emitting markers at the front are tracked because the status of the HMD 18 in the depth direction has yet to be established.

In this case, a movie in which the user turns around may not be detected correctly. If the user is predicted to initiate the action of turning around, the user is notified that the shape model has yet to be completed and/or is given a warning sound. As another alternative, while the main data image such as a virtual world is being displayed, a display may be given indicating that the shape model is not complete. For example, where a 360-degree virtual world is represented by the HMD 18, some regions of the virtual world entering the field of view when the user turns his/her face at undetectable angles may be painted in grey indicating that the regions are invalid. At the same time, the user may be instructed, by text or by arrow markings, to face the direction in which necessary images are to be acquired. In this case, as more and more necessary images are obtained, the shape model is progressively defined thereby. Concurrently, more and more invalid regions of the virtual world are eliminated. At the time the acquisition of the shape model is completed, the virtual world is completed in all directions.

If the acquired shape model is to be modified for higher accuracy, images showing the predetermined number of light-emitting markers (e.g., three markers) are obtained at suitable intervals. The positional relationships of the imaged markers are used as the basis for modifying the shape model. A shape model at a given point in time is compared with a shape model at the preceding point in time so as to verify how the shape model ends. When the shape model is determined to be ending, the shape model may be left unmodified thereafter. Alternatively, the shape model may be modified periodically to allow for the varying condition (e.g., slacking) of the wear band 106 as mentioned above.

Figure 16A:
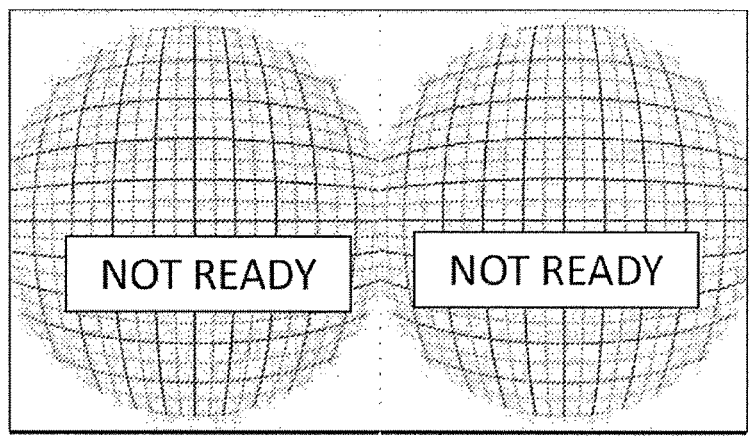
FIGS. 16A, 16B and 16C are schematic diagrams showing exemplary images notifying the user of the information regarding the process of acquiring a shape model in steps S30, S36, and S40 of the flowchart in FIG. 15.
Figure 16B:
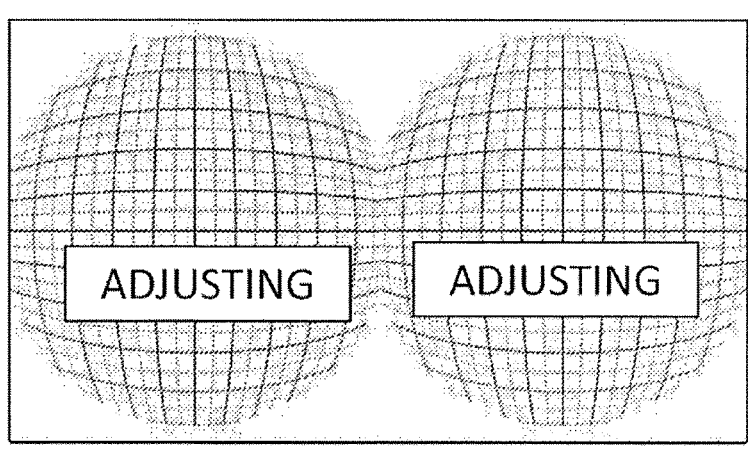
Figure 16C:
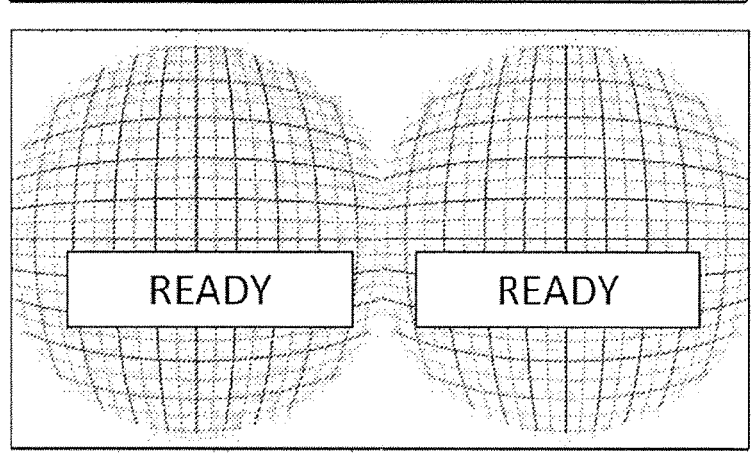

FIGS. 16A, 16B, and 16C show exemplary images notifying the user of the information regarding the process of acquiring the shape model in steps S30, S36, and S40 of the flowchart in FIG. 15. These are images displayed on the HMD 18 as explained earlier with reference to FIGS. 9A and 9B. The left and right parallax images constituting the main data are displayed on the left and right equal-size regions making up the display screen. If the process of shape model acquisition is not carried out in parallel with the processing by the information processing section 76, the main data image may be a menu image or an initial image.

First, in step S30 of FIG. 15, the notification that necessary images are being obtained is given in the form of text information "NOT READY" as illustrated in FIG. 16A. The images representing the text information are overlaid with each other in the same manner as the auxiliary data images overlaid with one another as discussed above. Thus in practice, the text information is subjected to distortion correction to match the lenses. At this moment, as discussed above, an image or an object guiding the user in the appropriate direction may be displayed, or a voice announcing "please look to your right" may be output for example.

In step S36 of FIG. 15, the notification that the shape model is being acquired or modified is given by displaying text information "ADJUSTING" as shown in FIG. 16B. In step S40 of FIG. 15, the notification that shape model acquisition is completed is given by displaying text information "READY" as shown in FIG. 16C. The text information "READY" may be allowed to disappear upon elapse of a predetermined time period.

The images shown in FIGS. 16A through 16C are only examples. As long as the user is able to know how far the process of shape model acquisition has progressed, the user may be presented with information announcing the progress in any suitable manner. For example, a figure, such as a gauge or an hourglass indicating the timeline up to completion, may be presented. The timeline may also be represented by how an object displayed as part of the virtual world behaves. In other examples, a voice may be used to announce each of the steps of the timeline, or different sounds may be output at different steps constituting the timeline.

The embodiment discussed above involves an information processing system in which the target object in captured images is tracked and the result of tracking is subjected to information processing. In addition to the main images and sounds, such as those of game images and virtual worlds, that should be information processing, the system presents the user with the auxiliary data made up of intermediate data indicative of what is recognized by the information processing device regarding the real space. Specifically, the user is presented with captured images, results of tracking, and allowable moving ranges. This enables the user intuitively to understand elements adversely affecting the information processing, such as a camera failure, disconnections between devices, inappropriate lighting or image-capturing conditions, erroneously recognized tracked objects, or disappearing from the field of view of the camera, and thus prompts the user to take suitable countermeasures with ease.

A user wearing the HMD and immersed in a virtual world displayed thereon finds it particularly difficult to grasp the situation in the real space. If the ongoing information processing is suddenly disrupted typically by the user in such a state partially disappearing from the field of view of the camera, it is difficult to immediately identify the cause of the abnormality. A game frequently interrupted by the user disappearing from the field of view can be a source of stress. Even on the ordinary two-dimensional display, similar disruptions can take place while the user is being immersed in the game.

Where it is impossible to start information processing in the first place, the possible causes of the abnormality can be diverse and are difficult to identify. Presenting the above-described auxiliary data makes it easier at least to determine whether the elements indicated by the auxiliary data are normal. The auxiliary data further enables the field of view of the camera to be known accurately, allowing the user to grasp the relations between the field of view on the one hand and his/her presence and the surrounding objects on the other hand. This in turn permits the user to improve the settings of the camera and to act in a manner not disappearing from the field of view. Furthermore, the image or sound warning the user of his/her disappearing from the field of view, or the image or sound announcing the direction to return to upon such disappearance, may be included in the auxiliary data. The input of selection of the true tracked object may also be received. These measures contribute to solving the problem more efficiently and intuitively than before.

To carry out the process of tracking an object that varies its posture, the shape and size of the tracked object are obtained as the shape model. Specifically, images are captured of the object tracked in necessary directions, and the conditions of tracked object images from the captured images are used as the basis for obtaining or modifying the shape mode. Whereas these processes are usually performed by the information processing device alone, it may take a varying, sometimes inordinately long, time to complete the processing depending on the real space conditions such as movements of the tracked object. Such a wait state can be a source of stress for the user. The user is thus presented with the information announcing how the process is progressing, including information indicative of the current happenings and of the directions in which tracking is available and directions in which tracking is disabled.

Such information allows the user to know how far the processing has progressed and gives him/her a sense of reassurance. When the user is prompted to cooperate in acquiring the images in the necessary direction, the processing can be completed in an appreciably shorter time. For example, the user may be presented with the necessary direction to turn to or guided to spontaneously face that direction during the game, which further boosts the efficiency of the processing. If information processing, such as games, starts while the shape model is still being acquired, unexpected abnormalities are unlikely to occur because the user understands that the shape model has yet to be completed. This permits easy integration of acquisition of the shape model and information processing such as games. After the shape model is established, the transition to full-fledged information processing is implemented smoothly and naturally.

While the present disclosure has been described in conjunction with a specific embodiment given as an example, it should be understood by those skilled in the art that the above-described composing elements and various processes may be combined in diverse ways and that such combinations, variations and modifications also fall within the scope of this disclosure.

The present disclosure contains subject matter related to that disclosed in Japanese Patent Application 2015-015274 filed in the Japan Patent Office on Jan. 29, 2015, the entire content of which is hereby incorporated by reference.

What is claimed is:

1. An information processing device comprising:
    an imaging device,
    wherein the imaging device is a stereo camera having a fixed field of view,
    wherein a first camera of the stereo camera has a first fixed field of view, and
    wherein a second camera of the stereo camera has a second fixed field of view different than the first fixed field of view;
    an information processing section configured to detect a figure of a target object from an image captured by the imaging device,
    wherein the image is extracted from a movie of the target object so as to perform information processing on the detected image,
    wherein the target object is held or worn by a user located in the fixed field of view of the imaging device, and
    wherein the information processing section acquires position information about the target object using a left stereoscopic image from the first camera and a right stereoscopic image from the second camera;

a main data generating section configured to generate data of a main image using the left stereoscopic image and the right stereoscopic image to be displayed as a result of the information processing;

an auxiliary data generating section configured to generate data of an auxiliary image including the captured image; and an output data transmitting section configured to transmit to an output device the main image data and the auxiliary image data in relation to each other such that the main image and the auxiliary image are displayed together as a combined stereoscopic image, wherein the left stereoscopic image comprises a first overlaid indicator indicating a limit of the second fixed field of view of the second camera, and wherein the right stereoscopic image comprises a second overlaid indicator indicating a limited of the first fixed field of view of the first camera.

2. The information processing device according to claim 1, wherein the auxiliary data generating section generates data of an auxiliary image in the captured image, the auxiliary image representing information indicative of the result of the detection performed by the information processing section.

3. The information processing device according to claim 1, wherein the auxiliary data generating section concurrently generates a marker indicating a current target object currently used as the target object and at least one other marker indicating an other target object, wherein the user may control a displayed indicator to select the marker indicating the current target object or the maker indicating the other target object so that it is set as the target object.

4. The information processing device according to claim 1, wherein the auxiliary data generating section displays an auxiliary image in the combined stereoscopic image only when the target object has partially or completely disappeared from the fixed field of view the imaging device; and wherein the auxiliary data generating section ceases display of the auxiliary image when the target object is detected in the fixed field of view.

5. The information processing device according to claim 1, wherein the auxiliary data generating section generates an arrow image indicating a direction for the target object to return to only when the target object has partially or completely disappeared from the fixed field of view of the imaging device; and the output data transmitting section ceases output of the arrow image when the target object is detected in the fixed field of view.

6. The information processing device according to claim 1, wherein the main data generating section pastes and renders the auxiliary image as a texture onto an object in a virtual world to be rendered as the main image, thereby generating data of a virtual world image including the auxiliary image.

7. A display device comprising:

an output data receiving section configured to acquire, from an information processing device connected thereto, data relating a main image and to an auxiliary image, wherein the main image is an image to be displayed as a result of information processing performed on a figure of a target object detected from an image captured from a movie of the target object by stereo camera of the information processing device, and wherein the main image comprises a left stereoscopic image captured by a left camera and a right stereoscopic image captured by a right camera, wherein the left camera has a first field of view different than a second field of view of the right camera wherein the left stereoscopic image comprises an indicator outline of the second field of view, and wherein the right stereoscopic image comprises an indicator outline of the first field of view, wherein the display device is worn by a user, and wherein the auxiliary image includes an image of the target object; and a display processing section configured to display the main image and the auxiliary image together using the display device.

8. An information processing method comprising:

capturing a movie of a target object using a stereo camera comprising a left camera and a right camera, wherein the stereo camera is stationary and has a fixed field of view, and wherein the target object is held or worn by a user located in the fixed field of view of the stereo camera;

performing information processing on a figure of the target object detected in the movie of the target;

generating data of a main image to be displayed as a result of the information processing, wherein the main image comprises a left stereoscopic image captured by the left camera and a right stereoscopic image captured by the right camera, wherein the left camera has a first field of view different than a second filed of view of the right camera wherein the left stereoscopic image comprises an indicator outline of the second filed of view, and wherein the right stereoscopic image comprises an indicator outline of the first filed of view, generating data of an auxiliary image including the captured image; and transmitting to an output device the main image data and the auxiliary image data in relation to each other such that the main image and the auxiliary image are displayed together, wherein the auxiliary image includes an image of the target object.

* * * * *